US012803724B2

(12) United States Patent
Manolakos et al.

(10) Patent No.: US 12,803,724 B2
(45) Date of Patent: Nov. 17, 2026

(54) RADIO FREQUENCY (RF) SENSING USING A SHARED PHYSICAL CHANNEL

(71) Applicant: QUALCOMM Incorporated, San Diego, CA (US)

(72) Inventors: Alexandros Manolakos, Escondido, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 18/255,096

(22) PCT Filed: Jan. 31, 2022

(86) PCT No.: PCT/US2022/070440
§ 371 (c)(1),
(2) Date: May 30, 2023

(87) PCT Pub. No.: WO2022/187774
PCT Pub. Date: Sep. 9, 2022

(65) Prior Publication Data

US 2024/0007236 A1 Jan. 4, 2024

(30) Foreign Application Priority Data

Mar. 1, 2021 (GR) .............................. 20210100118

(51) Int. Cl.
*H04W 72/04* (2023.01)
*H04L 5/00* (2006.01)
(Continued)

(52) U.S. Cl.
CPC .......... *H04L 5/0007* (2013.01); *H04L 5/0048* (2013.01)

(58) Field of Classification Search
None
See application file for complete search history.

(56) References Cited

U.S. PATENT DOCUMENTS 10,880,062 B2 12/2020 Ly et al.
11,038,646 B2 6/2021 Luo et al.
(Continued)

FOREIGN PATENT DOCUMENTS

CN 105676199 A 6/2016
CN 108957417 A 12/2018
(Continued)

OTHER PUBLICATIONS

Zhang et al. (Enabling Joint Communication and Radar Sensing in Mobile Networks—A Survey, Jan. 16, 2021) (Year: 2021).*
(Continued)

*Primary Examiner* — Maharishi V Khirodhar
(74) *Attorney, Agent, or Firm* — QUALCOMM Incorporated

(57) ABSTRACT

A shared physical channel can be used for passive radio frequency (RF) sensing of an object in a wireless communication network. Embodiments can comprise methods, devices, systems, and/or other means for receiving the shared physical channel, where the shared physical channel is received via RF signals transmitted by a transmitting device and reflected to the receiving device from the object. Data of the shared physical channel can be decoded based on a demodulation reference signal (DMRS) of the shared physical channel. Subsequent to decoding, modulation symbols used to transmit the shared physical channel and DMRS can be reconstructed. One or more RF sensing measurements of the object can be made using the reconstructed modulation symbols.

28 Claims, 15 Drawing Sheets

(51) Int. Cl.
*H04W 76/00* (2018.01)
*H04W 88/08* (2009.01)

(56) References Cited

U.S. PATENT DOCUMENTS

2019/0230475 A1 7/2019 Edge et al.
2021/0302561 A1* 9/2021 Bayesteh ................ G01S 13/42
2022/0053546 A1* 2/2022 Shi ........................ H04B 7/0408
2022/0255680 A1* 8/2022 Moon ................... H04L 1/1812
2023/0318177 A1* 10/2023 Zhou ................... H04L 25/0204
455/456.1

FOREIGN PATENT DOCUMENTS

CN 112118540 A 12/2020
WO 2019005311 1/2019
WO 2019005607 1/2019
WO WO-2020138984 A1 7/2020
WO WO-2020246850 A1 12/2020

OTHER PUBLICATIONS

International Search Report and Written Opinion—PCT/US2022/070440—ISA/EPO—Apr. 26, 2022.
Zhang J.A., et al., “Enabling Joint Communication and Radar Sensing in Mobile Networks—A Survey”, arxiv.org, Cornell University Library, 201 Olin Library Cornell University, Ithaca, NY, 14853, Jan. 16, 2021 (Jan. 16, 2021), pp. 1-32, XP081860546, Sections II-V, Figures 2-4.
European Search Report—EP25206810—Search Authority—Munich—Jan. 15, 2026.
Zhang J.A., et al., “Enabling Joint Communication and Radar Sensing in Mobile Networks—A Survey”, arXiv: 2006.07559V3 [eess.SP], 11 Pages, Jan. 16, 2021, pp. 1, 4-13.

* cited by examiner

RADIO FREQUENCY (RF) SENSING USING A SHARED PHYSICAL CHANNEL

RELATED APPLICATIONS

This application is a National Phase entry of International Application No. PCT/US2022/070440, filed Jan. 31, 2022, entitled "RADIO FREQUENCY (RF) SENSING USING A SHARED PHYSICAL CHANNEL" which claims the benefit of Greek Application No. 20210100118, filed Mar. 1, 2021, entitled "RADIO FREQUENCY (RF) SENSING USING A SHARED PHYSICAL CHANNEL", both of which are assigned to the assignee hereof, and incorporated herein in their entirety by reference.

BACKGROUND

1. Field of Invention

The present invention relates generally to the field of wireless communications, and more specifically to determining the location or position of an object with radio frequency (RF) signals using RF sensing techniques.

2. Description of Related Art

In a wireless communication network, RF sensing techniques are being developed to determine the position of an object. These techniques can involve transmission of RF signals by a transmitting device, which reflect off the object and are received by a receiving device. These sensing techniques may use specialized signals transmitted by the transmitting device to enable the receiving device to perform RF sensing measurements for the RF sensing. These specialized signals are also processed in a unique manner by the receiving device. However, the use of these specialized signals can come with a lot of overhead.

BRIEF SUMMARY

An example method of using a shared physical channel for passive radio frequency (RF) sensing of an object in a wireless communication network, according to this disclosure, comprises receiving the shared physical channel, where the shared physical channel is received via RF signals transmitted by a transmitting device and reflected to the receiving device from the object. The method also comprises decoding data of the shared physical channel based on a demodulation reference signal (DMRS) of the shared physical channel. The method also comprises subsequent to decoding, reconstructing modulation symbols used to transmit the shared physical channel and DMRS. The method also comprises making one or more RF sensing measurements of the object using the reconstructed modulation symbols.

Another example method of using a shared physical channel for passive radio frequency (RF) sensing of an object in a wireless communication network, according to this disclosure, comprises determining the shared physical channel to be used by a receiving device for the passive RF sensing, where the shared physical channel is to be transmitted via RF signals by a transmitting device. The method also comprises sending a configuration to the receiving device, where the configuration includes information regarding one or more properties of the shared physical channel. The method also comprises receiving one or more RF sensing measurements of the object made by the receiving device, the one or more RF sensing measurements based on the RF signals reflected to the receiving device from the object.

An example device, according to this disclosure, comprises a transceiver, a memory, and one or more processing units communicatively coupled with the transceiver and the memory. The one or more processing units are configured to receive, via the transceiver, a shared physical channel, where the shared physical channel is received via radio frequency (RF) signals transmitted by a transmitting device and reflected to the receiving device from an object. The one or more processing units are also configured to decode data of the shared physical channel based on a demodulation reference signal (DMRS) of the shared physical channel. The one or more processing units are also configured to subsequent to decoding, reconstruct modulation symbols used to transmit the shared physical channel and DMRS. The one or more processing units are also configured to make one or more RF sensing measurements of an object using the reconstructed modulation symbols.

Another example device, according to this disclosure, comprises a transceiver, a memory, and one or more processing units communicatively coupled with the transceiver and the memory. The one or more processing units configured to determine a shared physical channel to be used by a receiving device for passive radio frequency (RF) sensing, where the shared physical channel is to be transmitted via RF signals by a transmitting device. The one or more processing units are also configured to send, via the transceiver, a configuration to the receiving device, where the configuration includes information regarding one or more properties of the shared physical channel. The one or more processing units are also configured to receive, via the transceiver, one or more RF sensing measurements of an object made by the receiving device, the one or more RF sensing measurements based on the RF signals reflected to the receiving device from the object.

An example device for using a shared physical channel for passive radio frequency (RF) sensing of an object in a wireless communication network, according to this disclosure, comprises means for receiving the shared physical channel, where the shared physical channel is received via RF signals transmitted by a transmitting device and reflected to the device from the object. The device also comprises means for decoding data of the shared physical channel based on a demodulation reference signal (DMRS) of the shared physical channel. The device also comprises means for, subsequent to decoding, reconstructing modulation symbols used to transmit the shared physical channel and DMRS. The device also comprises means for making one or more RF sensing measurements of the object using the reconstructed modulation symbols.

An example system for using a shared physical channel for passive radio frequency (RF) sensing of an object in a wireless communication network, according to this disclosure, comprises means for determining the shared physical channel to be used by a receiving device for the passive RF sensing, where the shared physical channel is to be transmitted via RF signals by a transmitting device. The system also comprises means for sending a configuration to the receiving device, where the configuration includes information regarding one or more properties of the shared physical channel. The system also comprises means for receiving one or more RF sensing measurements of the object made by the receiving device, the one or more RF sensing measurements based on the RF signals reflected to the receiving device from the object.

An example non-transitory computer-readable medium, according to this disclosure, stores instructions for using a shared physical channel for passive radio frequency (RF) sensing of an object in a wireless communication network. The instructions comprise code for receiving the shared physical channel, where the shared physical channel is received via RF signals transmitted by a transmitting device and reflected to the device from the object. The instructions also comprise code for decoding data of the shared physical channel based on a demodulation reference signal (DMRS) of the shared physical channel. The instructions also comprise code for, subsequent to decoding, reconstructing modulation symbols used to transmit the shared physical channel and DMRS. The instructions also comprise code for making one or more RF sensing measurements of the object using the reconstructed modulation symbols.

Another example non-transitory computer-readable medium, according to this disclosure, stores instructions for using a shared physical channel for passive radio frequency (RF) sensing of an object in a wireless communication network. The instructions comprise code for determining the shared physical channel to be used by a receiving device for the passive RF sensing, where the shared physical channel is to be transmitted via RF signals by a transmitting device. The instructions also comprise code for sending a configuration to the receiving device, where the configuration includes information regarding one or more properties of the shared physical channel. The instructions also comprise code for receiving one or more RF sensing measurements of the object made by the receiving device, the one or more RF sensing measurements based on the RF signals reflected to the receiving device from the object.

Figure 1:
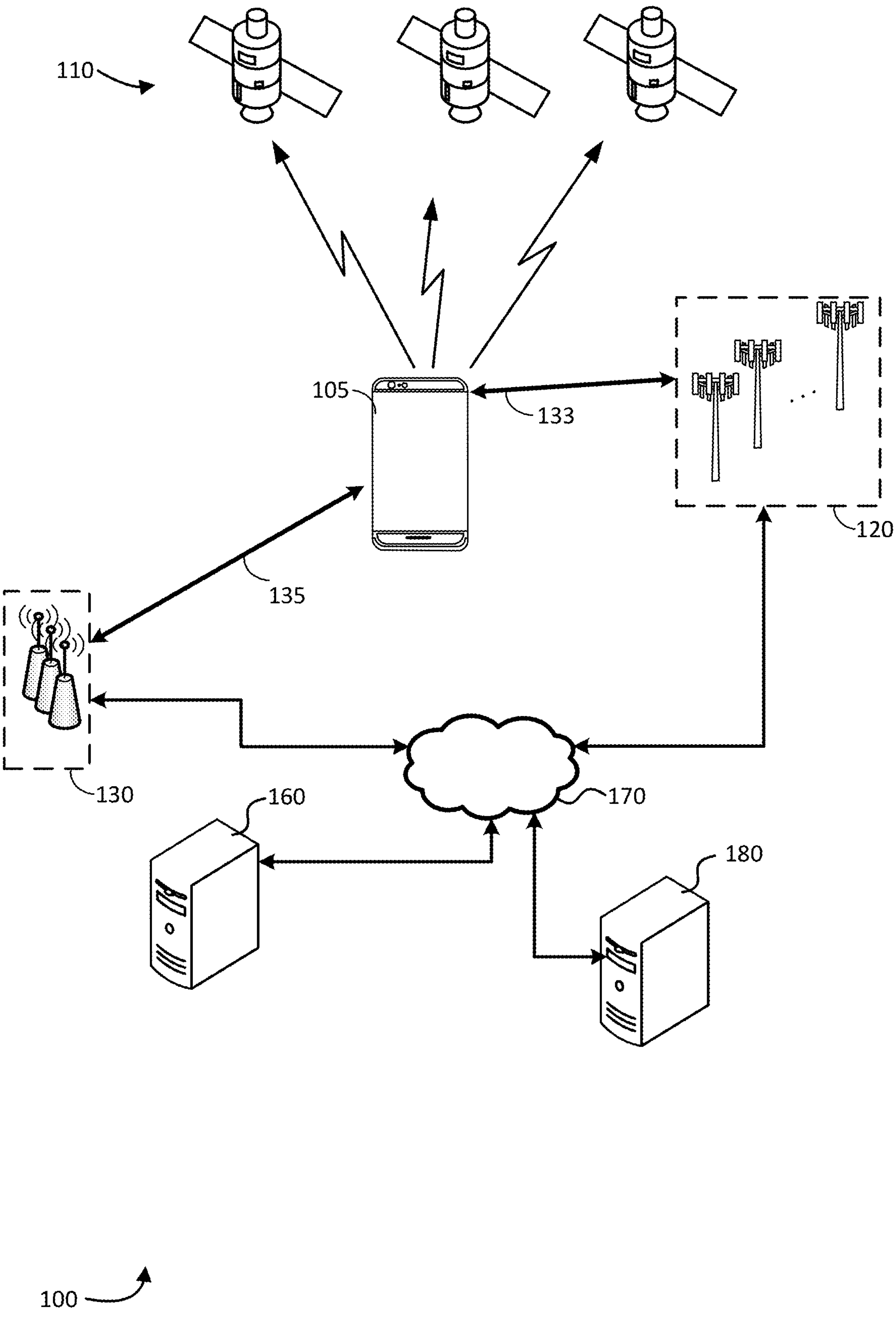
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, the term "shared physical channel" refers to a shared data channel in a physical layer of wireless communication (e.g., via RF signals) between a transmitting device and receiving device. In particular, shared physical channels refer to the Physical Downlink Shared Channel (PDSCH), Physical Uplink Shared Channel (PUSCH), and/or Physical Sidelink Shared Channel (PSSCH), which are used in Long-Term Evolution (LTE) and New Radio (NR) wireless communication technologies. As noted herein below, these wireless technologies are defined, or are being defined, by the 3rd Generation Partnership Project (3GPP). Shared physical channels PDSCH, PUSCH, and PSSCH may also be referred to herein collectively and generically as "PxSCH."

As used herein, the terms "RF sensing," "passive RF sensing," and variants refer to a process by which one or more objects are detected using RF signals transmitted by a transmitting device and, after reflecting from the one or more objects, received by the receiving device. As described hereafter in more detail, the receiving device can make measurements of these reflected RF signals to determine one or more characteristics of the one or more objects, such as location, angle, direction, orientation, Doppler, velocity, etc. The RF sensing is described as "passive" in that no RF signals need to be transmitted by the receiving device or one or more objects for the one or more objects to be detected.

As noted, in wireless communication network, RF sensing techniques may detect an object by taking measurements at a receiving device of RF signals that have been transmitted by a transmitting device and have reflected off of the object prior to being received by the receiving device. Because these RF sensing measurements involve determining timing and other aspects of the received RF signals with more accurately than in typical wireless communications, the received RF signals are processed by the receiving device in a manner differently than with typical wireless communications. However, the use of dedicated signaling and processing to perform these RF sensing measurements can involve a large amount of overhead. This can be especially true where longer-duration signals are used to increase Doppler resolution and Signal-to-Noise Ratio (SNR) for the RF sensing measurements.

To address these and other issues, embodiments herein provide RF sensing techniques that leverage properties of shared physical channels in existing wireless communications to perform RF sensing. In particular, these techniques comprise extracting data of the shared physical channel based on a Demodulation Reference Signal (DMRS) of the shared physical channel and, after verifying correct decoding, reconstructing the modulation symbols used to transmit the shared physical channel and DMRS. RF sensing measurements can then be made of the shared physical channel and DMRS by using the reconstructed modulation symbols as a correlation reference for the RF sensing measurements. A detailed description of embodiments is provided hereinafter.

FIG. 1 is a simplified illustration of a positioning system 100 in which a UE 105, location server 160, and/or other components of the positioning system 100 can use the techniques provided herein for using a shared physical channel for RF sensing, according to an embodiment. The techniques described herein may be implemented by one or more components of the positioning system 100. The positioning system 100 can include a UE 105, one or more satellites 110 (also referred to as space vehicles (SVs)) for a Global Navigation Satellite System (GNSS) such as the Global Positioning System (GPS), base stations 120, access points (APs) 130, location server 160, network 170, and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference RF signals the UE 105 is measuring.

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, location of the UE 105 estimated at least in part based on measurements of RF signals communicated between the UE 105 and one or more other UEs (not shown in FIG. 1), which may be mobile. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
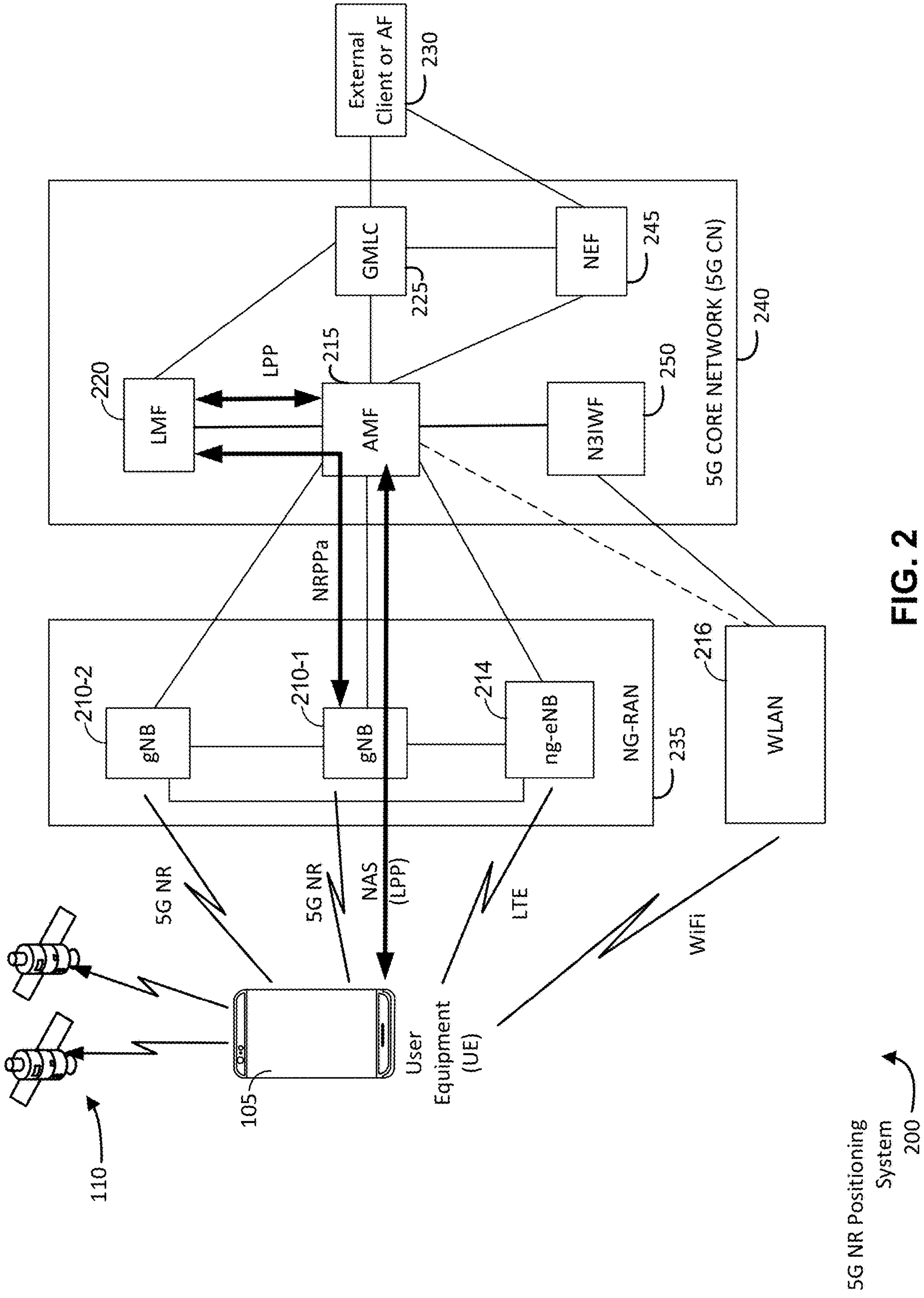
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate indirectly via another component of the 5G NR positioning system 200, such as the LMF 220.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematics (RTK), Precise Point Positioning (PPP), Differential GNSS (DGNSS), ECID, angle of arrival (AOA), angle of departure (AOD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. Location measurements may include one or more of a Received Signal Strength Indicator (RSSI), Round Trip signal propagation Time (RTT), Reference Signal Received Power (RSRP), Reference Signal Received Quality (RSRQ), Time of Arrival (TOA), AOA, Differential AOA (DAOA), AOD, or Timing Advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for GNSS satellites 110), WLAN, etc. With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In a 5G NR positioning system 200, some location measurements taken by the UE 105 (e.g., AOA, AOD, TOA) may use RF reference signals received from base stations 210 and 214. These signals may comprise PRS, which can be used, for example, to execute OTDOA, AOD, and RTT-based positioning of the UE 105. Other reference signals that can be used for positioning may include Sounding Reference Signal (SRS), Channel State Information Reference Signal (CSI-RS), synchronization signals (e.g., synchronization signal block (SSB) Synchronizations Signal (SS)), etc. Moreover, the signals may be transmitted in a Tx beam (e.g., using beamforming techniques), which may impact angular measurements, such as AOD. These signals—and all wireless communications in the 5G NR Positioning System 200 may utilize a physical-layer communication as illustrated in FIGS. 3A-3D.

Figure 3A:
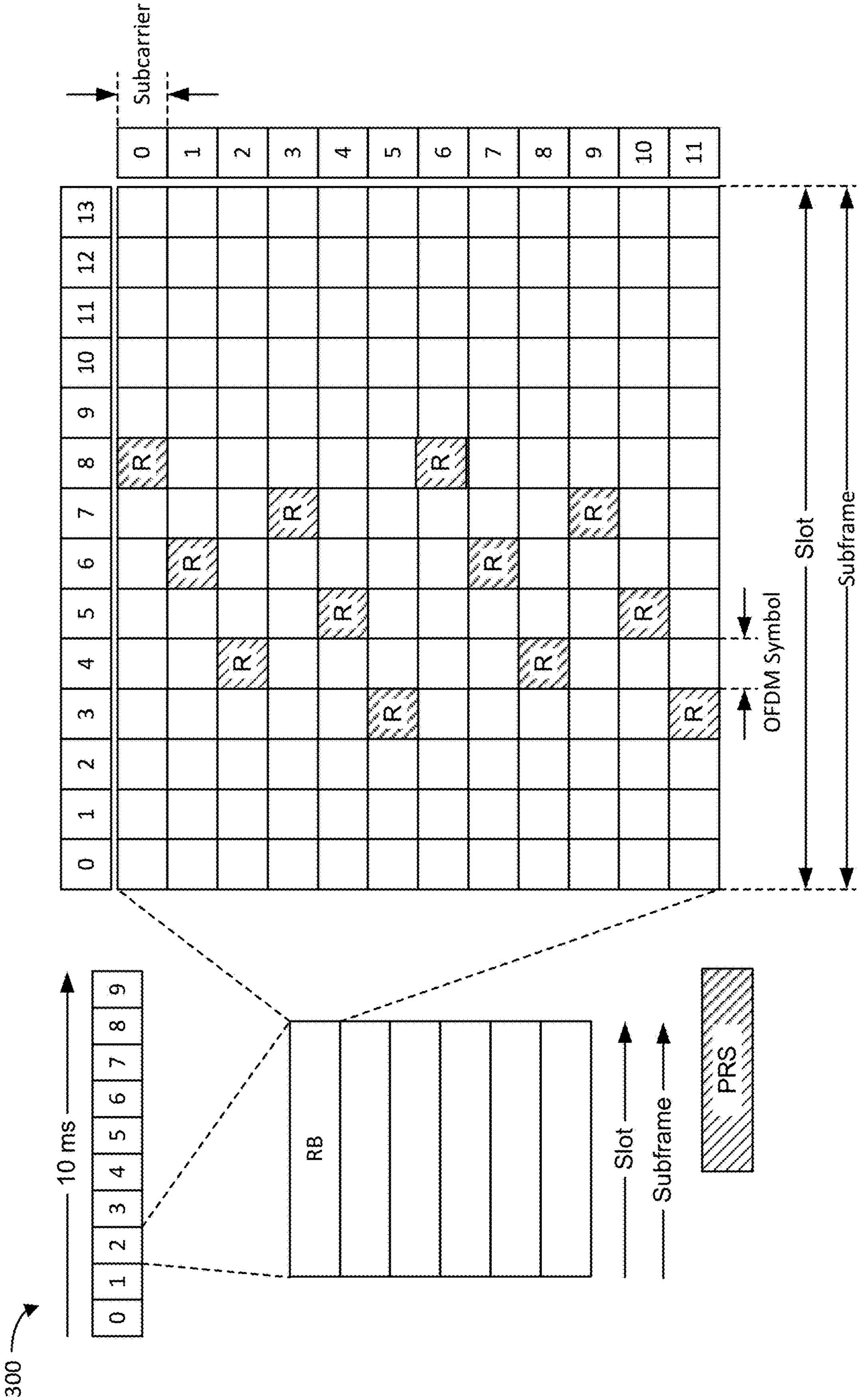
FIGS. 3A-3D are diagrams illustrating example physical channel communications, according to an embodiment.
Figure 3B:
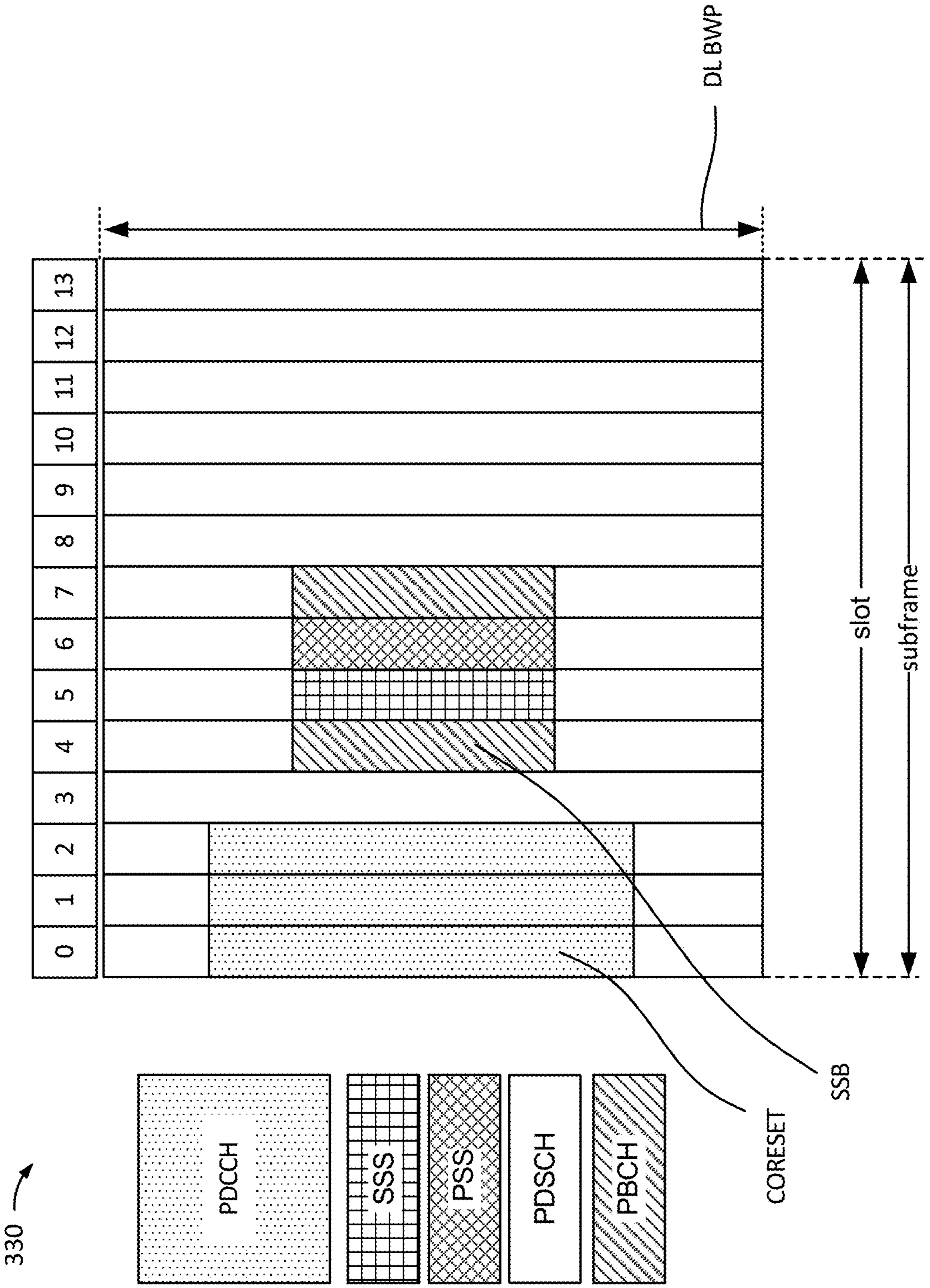
Figure 3C:
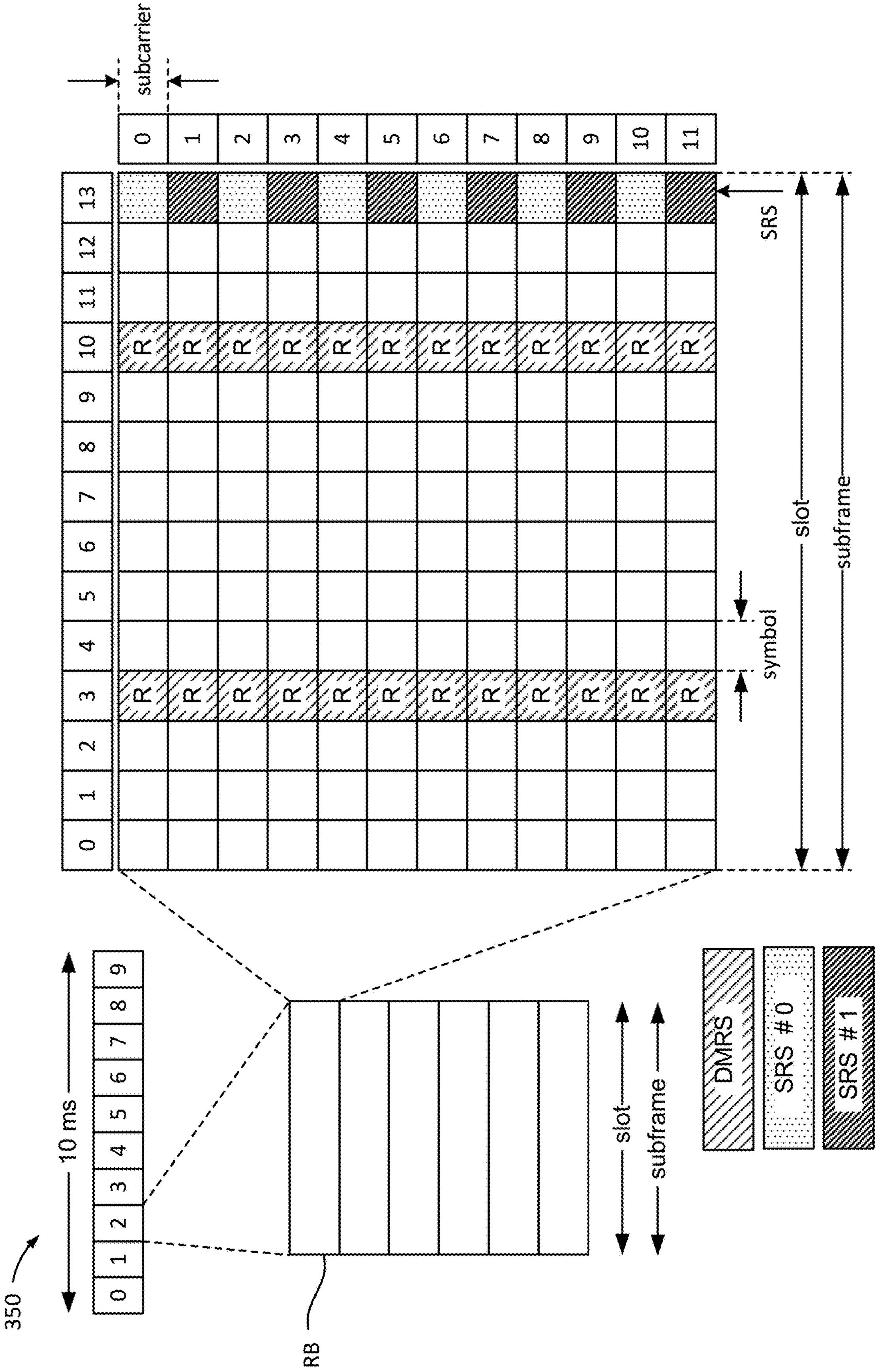
Figure 3D:
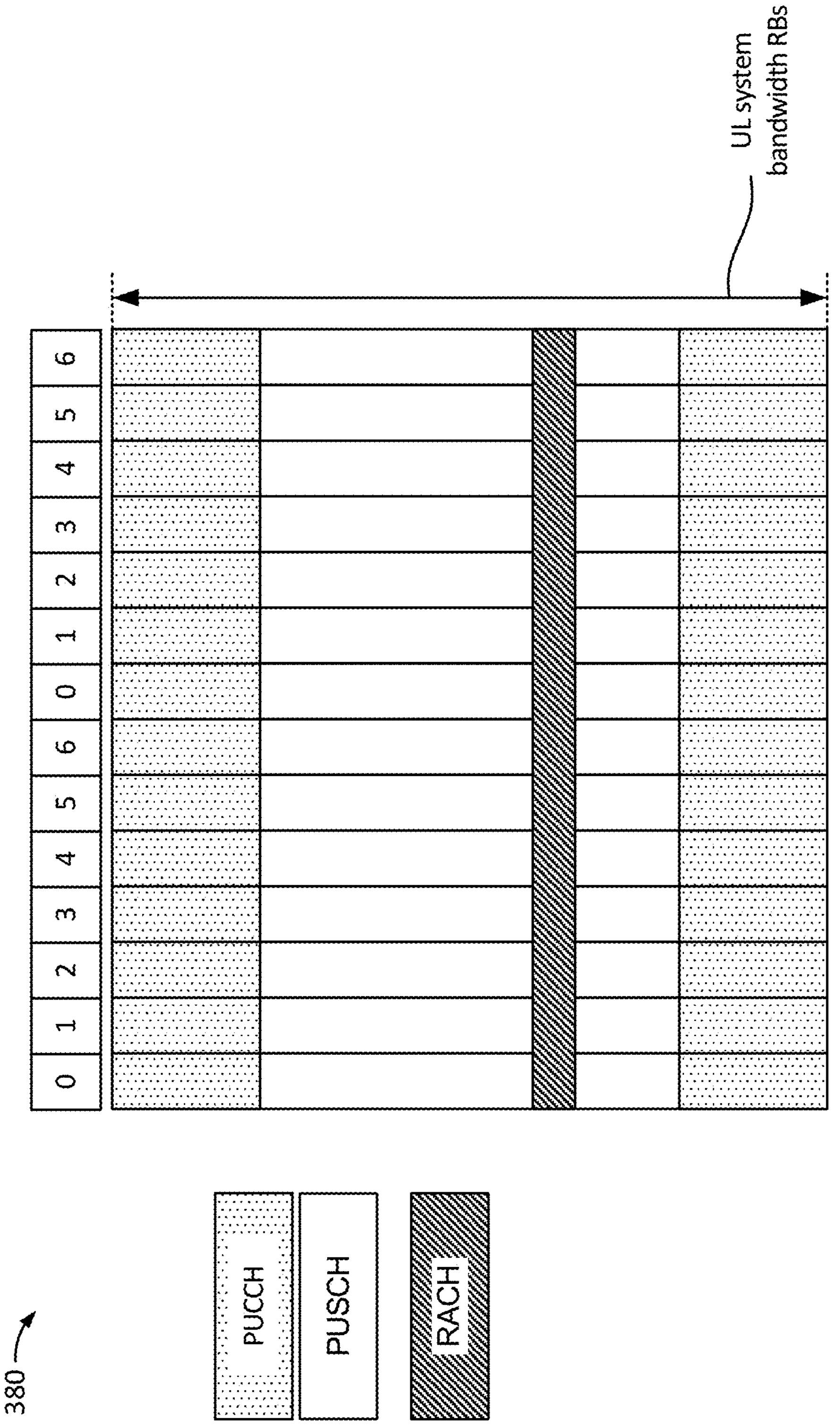

Various frame structures may be used to support downlink and uplink transmissions between network nodes (e.g., base stations and UEs). FIG. 3A is a diagram 300 illustrating an example of a downlink frame structure, according to aspects of the disclosure. FIG. 3B is a diagram 330 illustrating an example of channels within the downlink frame structure, according to aspects of the disclosure. FIG. 3C is a diagram 350 illustrating an example of an uplink frame structure, according to aspects of the disclosure. FIG. 3D is a diagram 380 illustrating an example of channels within an uplink frame structure, according to aspects of the disclosure. The frame structure for sidelink (SL) communications may be similar to the structures shown in FIGS. 3A-3D. Other wireless communications technologies may have different frame structures and/or different channels.

NR can utilize Orthogonal Frequency-Division Multiplexing (OFDM) on downlink (DL) (communications from TRP to UE), uplink (UL) (communications from UE to TRP) and/or SL (communications between UEs). LTE may use single-carrier frequency division multiplexing (SC-FDM) for UL communications. OFDM and SC-FDM partition the system bandwidth into multiple orthogonal subcarriers, which are also commonly referred to as tones, bins, etc. Each subcarrier may be modulated with data. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively. LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available In the example of FIGS. 3A-3D, a numerology of 15 kHz is used. Thus, in the time domain, a frame (e.g., 10 ms) is divided into 10 equally sized subframes of 1 ms each, and each subframe includes one time slot. In FIGS. 4A to 4D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 3A-3D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme. Some of the REs carry the previously-described reference signals. FIG. 3A illustrates exemplary locations of REs carrying PRS (labeled "R").

FIG. 3B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 3B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a Master Information Block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

As illustrated in FIG. 3C, some of the REs carry DMRS for channel estimation at the base station. The UE may additionally transmit SRS in, for example, the last symbol of a slot. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 3D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data and may additionally be used to carry a buffer status report (BSR), a power headroom report (PHR), and/or UCI.

Figure 4:
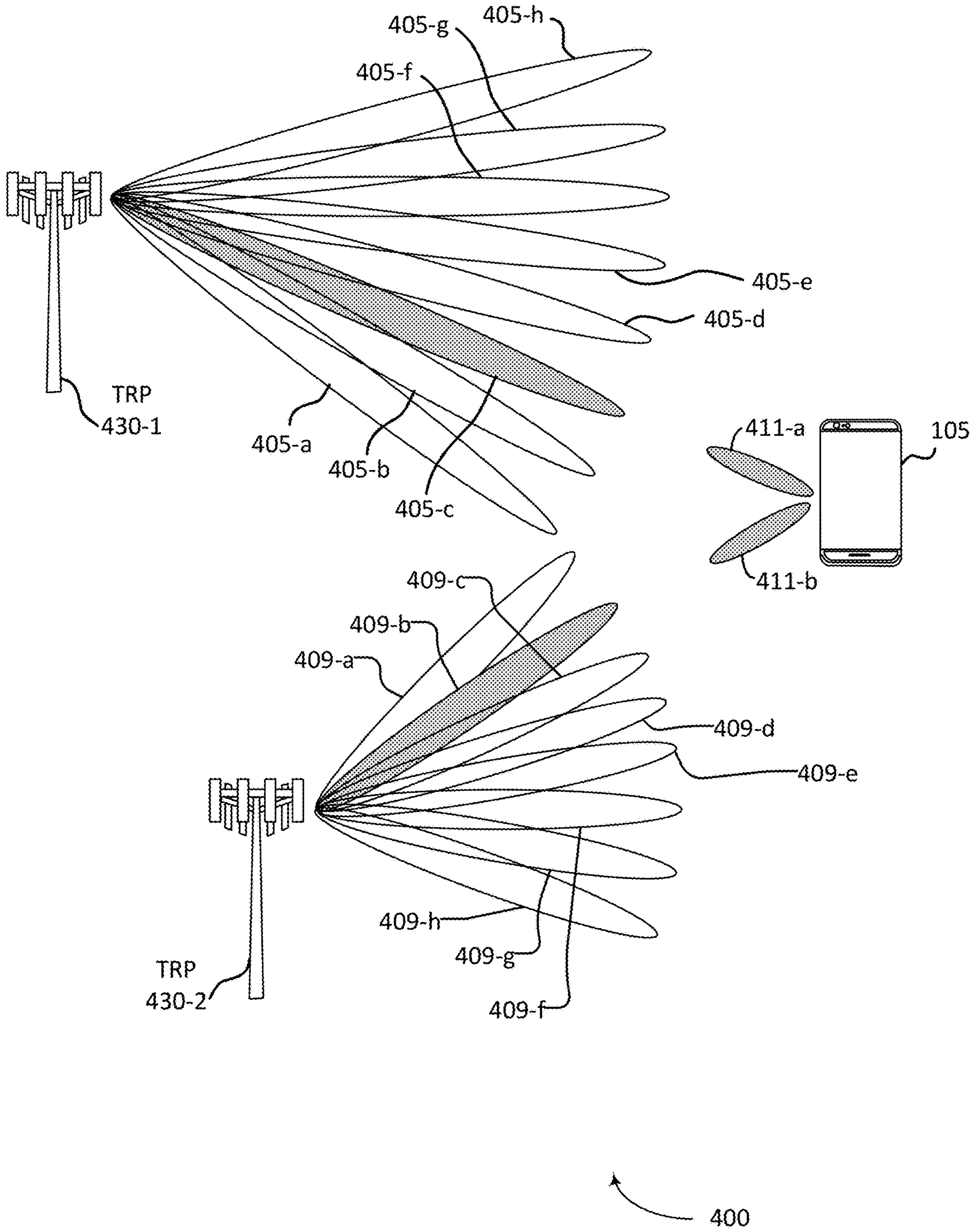
FIG. 4 is a diagram of how beamforming may be used in a positioning system, according to an embodiment.

As additional information regarding the formation of beams in a 5G NR positioning system 200, FIG. 4 is provided. FIG. 4 is a diagram illustrating a simplified environment 400 including two TRPs 430-1 and 430-2 (which may correspond to base stations 120 of FIG. 1 and/or gNBs 210 and/or ng-eNB 214 of FIG. 2) producing directional beams for transmitting RF reference signals, and a UE 105. Each of the directional beams is rotated, e.g., through 430 or 460 degrees, for each beam sweep, which may be periodically repeated. Each direction beam can include an RF reference signal (e.g., a PRS resource), where TRP 430-1 produces a set of RF reference signals that includes Tx beams 405-*a*, 405-*b*, 405-*c*, 405-*d*, 405-*e*, 405-*f*, 405-*g*, and 405-*h*, and the TRP 430-2 produces a set of RF reference signals that includes Tx beams 409-*a*, 409-*b*, 409-*c*, 409-*d*, 409-*e*, 409-*f*, 409-*g*, and 409-*h*. Because UE 105 may also include an antenna array, it can receive RF reference signals transmitted by TRPs 430-1 and 430-2 using beamforming to form respective receive beams (Rx beams) 411-*a* and 411-*b*. Beamforming in this manner (by TRPs 430 and optionally by UEs 105) can be used to make communications more efficient. It can also be used for other purposes, such as transmitting reference signals for RF sensing of an object. (An object detected using the RF sensing techniques described herein is also referred to herein as a "target.")

Tx beams 405 and 409 can be particularly useful for facilitating efficient communications between a TRP 430 and UE 105. And as noted, Tx beams can be used to make angular measurements (e.g., AoD measurements) for the positioning of the UE 105. Tx beams 405 and 409 further may be used to perform RF sensing of a target by the UE 105, in which RF signals can be directed toward the target via one or more beams, and one or more echo signals resulting from the RF signals reflecting off of the target is detected by the UE 105. Based on the one or more echo signals detected by the UE, information regarding the target (e.g., position, object type, etc.) may be determined. More generally, this process can be used to perform RF sensing to detect one or more targets near a UE 105 or other receiving device. Further, such RF sensing can be conducted with or without the use of Tx beams 405 and 409.

This type of RF sensing can be limited in the presence of one or more objects that can cause a blockage in the RF channel between a TRP 430 and UE 105. That is, RF sensing may be difficult to perform in situations where one or more blockages restrict RF signals from traveling between the TRP 430 and UE 105 and/or between a target and UE 105. Embodiments described herein address these and other issues by leveraging an RIS to redirect RF signals, enabling for RF sensing to occur even in the presence of one or more blockages. FIG. 4 and the following description below additional details regarding how this may be done.

Figure 5:
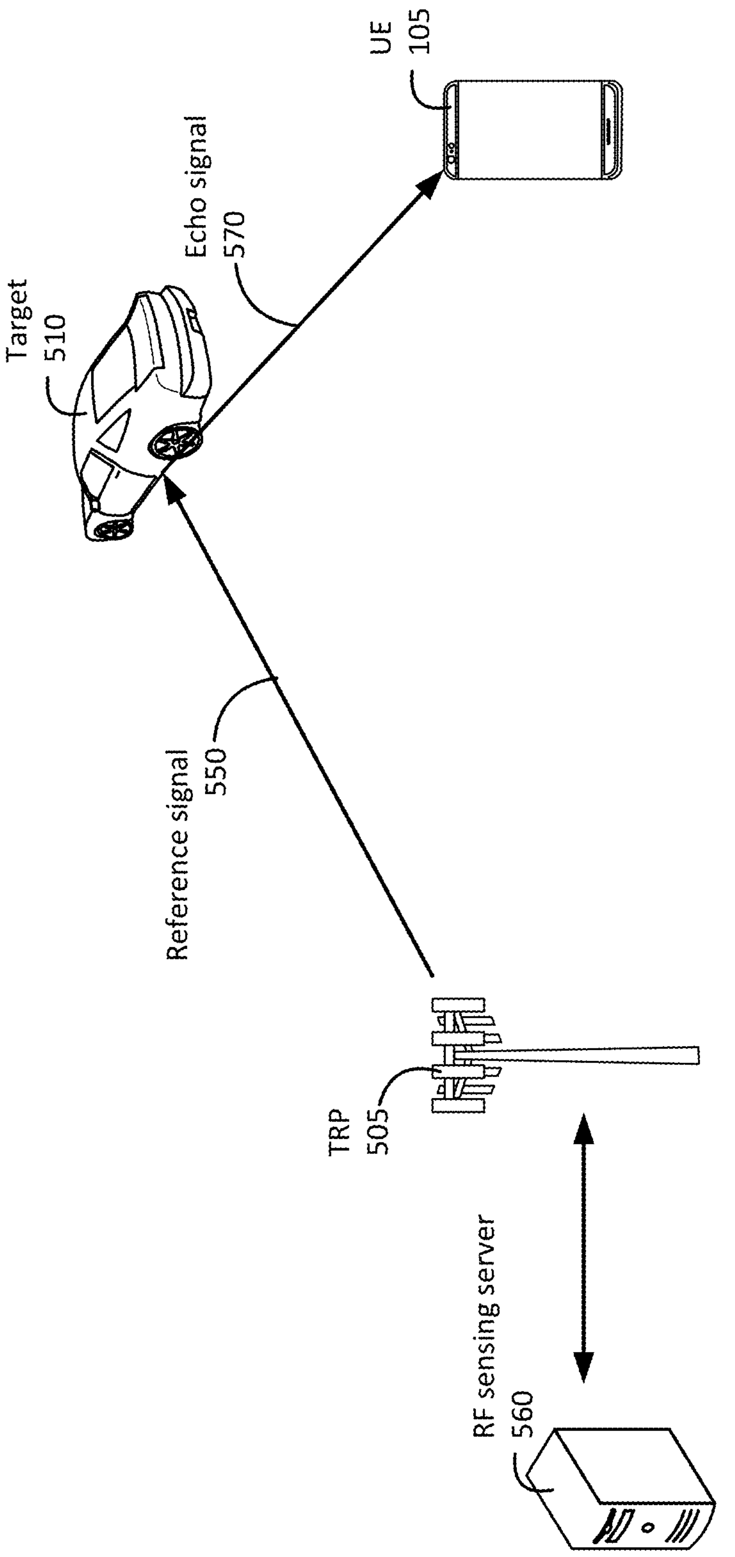
FIG. 5 is a simplified diagram illustrating generally how RF sensing can be used to determine the position of an particular object, or "target," according to an embodiment.

FIG. 5 is a simplified diagram illustrating generally how RF sensing can be used to determine the position of an object, target 510, according to an embodiment. The illustrated components may comprise components of a 5G NR positioning system 200 or, more broadly, a positioning system 100, which can be implemented in a wireless communication network, such as a cellular network. To perform the RF sensing, the TRP 505 (which may comprise a serving TRP for the UE 105) acts as a transmitting device, and the UE 105 act says a receiving device. (Although, as noted below, different types of devices may act as the transmitting and/or receiving devices.) RF sensing may be used to detect/position the target 510 by transmitting one or more reference signals 550 from the TRP 505. The reference signal 550 is reflected by the target 510, and the reflection, echo signal 570, is received by the UE 105. (The UE 105 may also receive the reference signal directly from the TRP 505 as well as other echo signals (not shown) of the reference signal 550 from other objects. Accordingly, it the UE 105 may process the direct and/or echo signals accordingly, ignoring or detecting the other objects.) The UE 105 may take RF sensing measurements of the echo signal 570 by determining, for example, a power delay profile, time of arrival (ToA), angle of arrival, Doppler shift, or similar features of the echo signal 570. These RF sensing measurements ultimately can be used to determine the position of the target 510.

As previously noted, contemplated implementations of RF sensing may use specialized RF signals as the reference signal 550. These specialized RF signals can have particular waveform properties to help ensure RF sensing measurements are accurate and effective. For example, a reference signal uniformly spaced in frequency can enable robust and efficient time-domain based processing for ToA detection. A reference signal uniformly spaced in time can help facilitate Doppler-domain-based processing for Doppler shift detection. A reference signal having a long-duration can help enhance coverage and increase Doppler resolution. However, using specialized RF signals can involve a large amount of overhead. As noted, this can be especially true where longer-duration signals are used to increase Doppler resolution and Signal-to-Noise Ratio (SNR) for the RF sensing measurements. For these reasons, it is uncertain whether specialized RF signals for RF sensing will be implemented in relevant wireless communication standards.

To address these and other issues, embodiments herein provide RF sensing techniques that leverage properties of shared physical channels (e.g., PxSCH) in existing wireless communications to perform RF sensing. In particular, these techniques comprise decoding the data of the shared physical channel based on the associated DMRS of the shared physical channel and, reconstructing the modulation symbols used to transmit the shared physical channel and DMRS. RF sensing measurements can then be made of the shared physical channel and DMRS by using the reconstructed modulation symbols. The modulation symbols can be used, for example, as a correlation reference for the RF sensing measurements.

Figure 6:
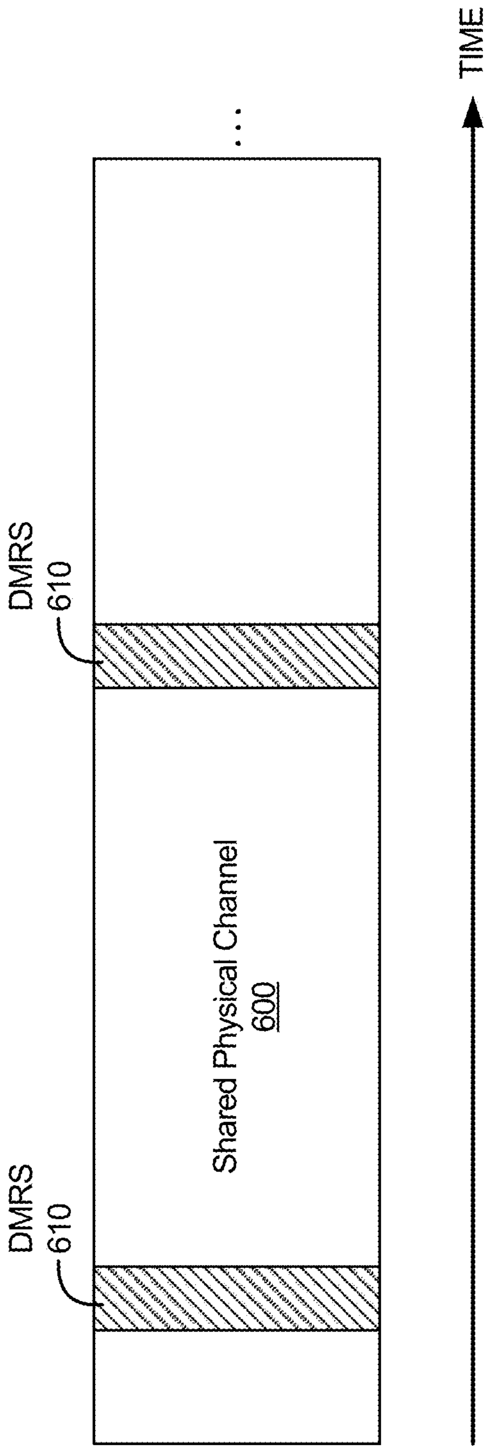
FIG. 6 is a diagram showing an example of a shared physical channel with an associated Demodulation Reference Signal (DMRS), according to an embodiment.

FIG. 6 is a diagram of a shared physical channel 600 with an associated DMRS 610. The shared physical channel may be transmitted by a transmitting device via several resource blocks over the course of one or more slots. (FIG. 6 is therefore similar to FIG. 3C. However, FIG. 6 is not limited to UL communications from a UE but may also apply to DL and/or SL communications from a UE and/or base station.) A shared physical channel 600 is transmitted in combination with a DMRS 610, which can occupy one or more symbols of a slot.

Because the data of the shared physical channel 600 is initially unknown, it may not be useful for RF sensing measurements. Thus, embodiments may perform a "two-pass" processing technique to use the shared physical channel 600 and DMRS 610 for performing RF sensing measurements.

In the first pass, the receiving device can process of the shared physical channel 600 to extract the data of the shared physical channel 600. That is, the DMRS 610 is used by the receiving device to perform channel estimation of the shared physical channel 600. Once channel estimation is performed, the data of the shared physical channel can be demodulated and decoded, allowing the received device to access the data of the shared physical channel. The accuracy of the first pass can be verified by using an error-detecting code (e.g., cyclic redundancy check (CRC), parity check, etc.).

In the second pass, the correct decoding from the first pass can be leveraged to re-process the RF signals used to transmit the shared physical channel 600 to make RF sensing measurements. That is, with the accuracy of the decoding of the shared physical channel having been verified, the receiving device can then determine a better channel estimate for the shared physical channel 600 and reconstruct the transmission of the shared physical channel 600 and DMRS 610. More specifically, the modulation symbols (e.g., Quadrature Amplitude Modulation (QAM) symbols) of the shared physical channel 600 and DMRS 610 can be reconstructed and processed to make the RF sensing measurements, as if the modulation symbols of the shared physical channel 600 and DMRS 610 were modulation symbols of a reference signal used for RF sensing. In particular, the modulation symbols can be used as pilots (e.g., known sequences) for performing correlation/ToA measurements, etc., to obtain RF sensing information of a target/object.

Depending on desired functionality, RF sensing measurements can be used to obtain one or more types of information regarding a target. For example, RF sensing measurements may comprise a measurement of delay, Doppler, and/or angle response. With this information, a location, angle, direction, orientation, Doppler, and/or velocity of a target can be determined.

Figure 7A:
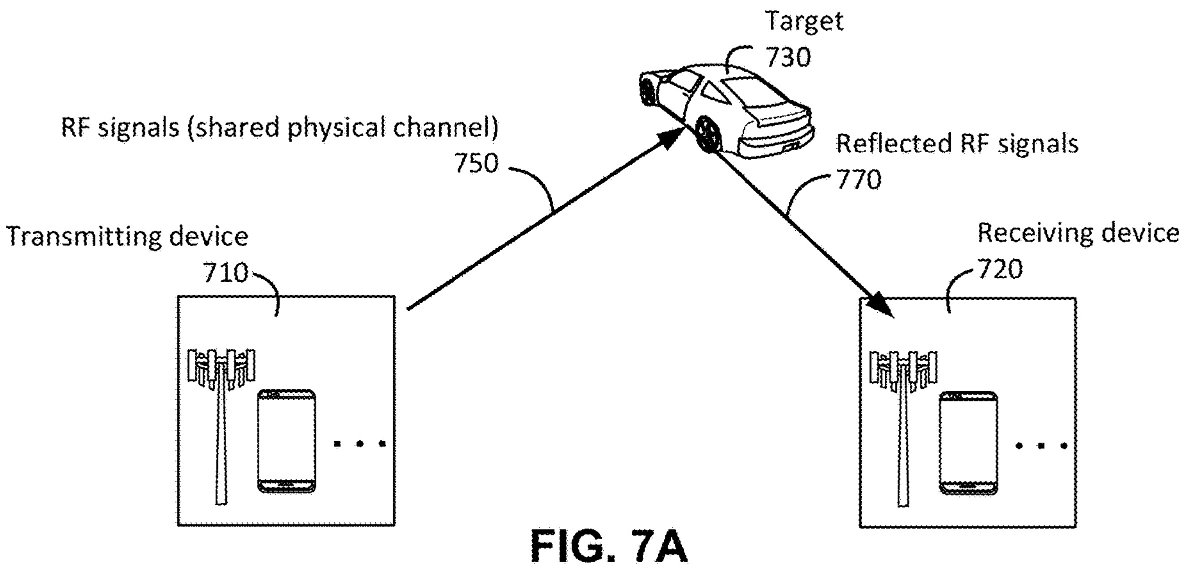
FIGS. 7A and 7B are datagrams illustrating different configurations for RF sensing of a target, according an embodiment.
Figure 7B:
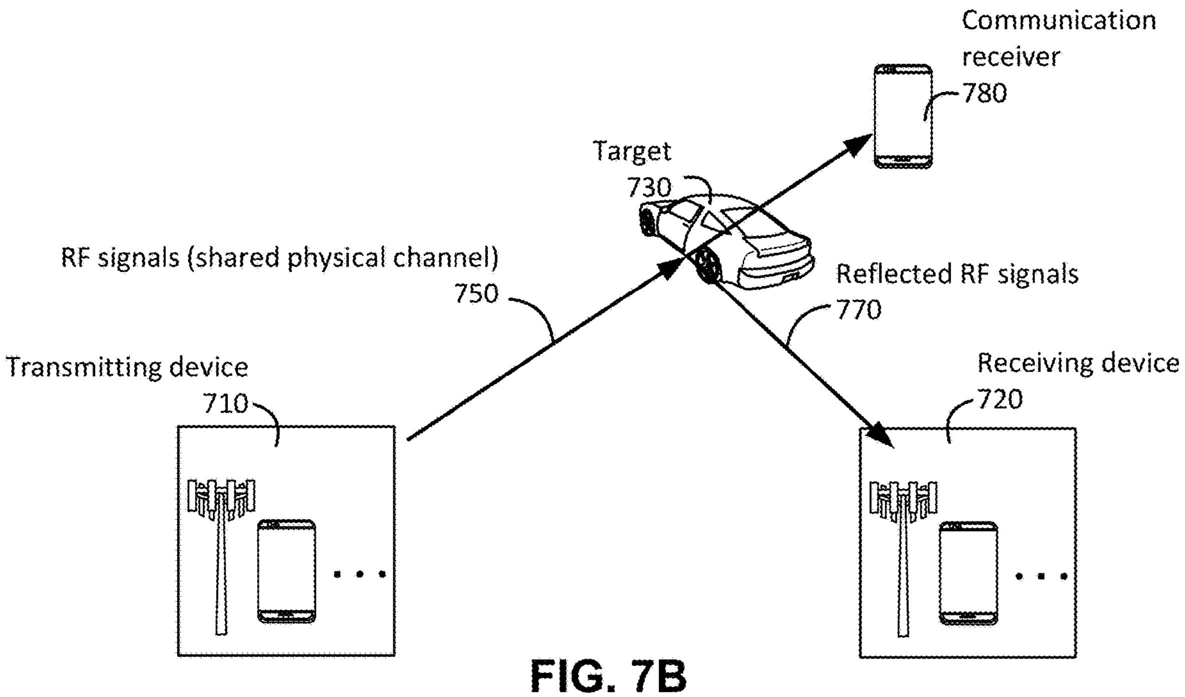

As previously noted, configurations aren't limited to DL communications as illustrated in FIG. 5. The shared physical channel may comprise, for example, a PxSCH transmitted as part of UL, DL, or SL for communications. As such, the techniques described herein for using shared physical channel for RF sensing may apply in a variety of scenarios. FIGS. 7A-7B are provided to help illustrate some of these scenarios.

FIG. 7A is a diagram, similar to the illustration in FIG. 5, but illustrating how a transmitting device 710 and/or receiving device 720 may comprise any of a variety of devices. The performance of RF sensing by the transmitting device 710 and receiving device 720 may be coordinated via an RF sensing server (not shown). As with the illustration in FIG. 5A, RF signals travel from the transmitting device 710 to the receiving device 720 after reflecting off of the target 730. Here, however, the transmitting device 710 may comprise any of a variety of TRPs or UEs. TRPs may comprise, for example, a regular gNB, small cell gNB, mobile or static gNB, etc. In such instances, the transmitting device 710 may therefore transmit a DL shared physical channel (e.g., PDSCH). Alternatively, any of a variety of UE types may comprise a transmitting device 710, including mobile phones, static or mobile IOT devices, wirelessly-connected computers, and the like. In such instances, the transmitting device 710 may therefore transmit a UL or SL shared physical channel (e.g., PUSCH or PSSCH). The receiving device 720, too, may comprise any of a variety of types of UEs or TRPs. Accordingly, as shown in FIG. 7A, RF signals 750 transmit the shared physical channel, and the corresponding reflected RF signals 770 are received by the receiving device 720, which processes the reflected RF signals 770 using a two-pass processing technique as described above.

According to some embodiments, the RF signals may be transmitted as part of a unicast, broadcast, or groupcast shared physical channel via a Uu and/or SL interface. Moreover, for unicast or groupcast transmissions, the receiving device 720 may or may not necessarily be the intended recipient of the shared physical channel. That is, according to some embodiments, a receiving device 720 may perform RF sensing measurements as described herein based on communication between two other devices. This idea further illustrated in FIG. 7B.

FIG. 7B is a diagram, similar to the illustration in FIG. 7A, but illustrating how RF sensing measurements by a receiving device 720 may be made using reflected RF signals 770 of communications intended for a communication receiver 780 different than the receiving device 720. In other words, in a unicast or groupcast scenario in which the content of the shared physical channel is intended for the communication receiver 780, reflected RF signals 770 may still be used by a receiving device 720 to make RF sensing measurements and perform RF sensing of the target 730. Because the receiving device 720 may not be the intended recipient of the communications, and RF sensing server may communicate the Radio Network Temporary Identifier (RNTI) of the shared physical channel to the receiving device 722 enable the receiving device to decode the data of the shared physical channel.

If, however, the receiving device 720 is both the intended recipient of the content of the shared physical channel and the receiving device 720 for purposes of taking RF sensing measurements (e.g., as illustrated in FIG. 7A), then embodiments may help ensure the detection of the target 730 by modifying the transmission of the RF signals 750. More specifically, if the transmitting device 710 uses beamforming to transmit the RF signals 750, then, according to some embodiments, the transmitting device 710 may redirect the beam to help ensure the RF signals 750 are reflected off the target 730. This may comprise, for example, using a different beam or adjusting a boresight of the beam to transmit the RF signals 750 toward the target 730 rather than directly toward the receiving device 720. This adjustment can be based on a known or estimated location of the target 730 in relation to the transmitting device 710 and, optionally, in relation to a known or estimated location of the receiving device 720. The known or estimated location of the target 730 may be determined from using object tracking and/or previous location estimates.

It can be noted that, although a single transmitting device 710 and a single receiving device 720 are illustrated in FIGS. 7A and 7B, embodiments are not so limited. According to some embodiments, RF sensing of a target 730 may be performed by multiple transmitting devices 710 and/or multiple receiving devices 720. Where multiple receiving devices 720 are used, each receiving device 720 may perform RF sensing measurements from a respective set of reflected RF signals 770, which may come from the same or different RF signals 750 transmitted by a transmitting device 710. In such configurations, RF sensing of the target 730 can be determined as described herein for each transmitter/receiver pair, then determinations for all transmitter/receiver pairs can be combined. In such configurations, this can increase accuracy and/or reliability of RF sensing (e.g., position determination) of the target 730.

To perform RF sensing as described in the embodiments herein, an RF sensing server may configure the receiving device 720 to make the RF sensing measurements. To do so, the RF sensing server may send a configuration to the receiving device 720 comprising information regarding the shared physical channel. If the receiving device 720 comprises a UE, this configuration may be relayed to the UE via a serving TRP (which, in some scenarios, may comprise the transmitting device 710). If the receiving device 720 comprises a TRP, the RF sensing server may send the configuration via wired communications.

The information included in the configuration may vary, depending on the particular type of RF sensing. Additional details regarding various types are provided hereinafter. However, the configuration may generally provide information regarding one or more properties of the shared physical channel. This can include, without limitation, a frequency allocation, a time allocation, a scrambling ID, a Modulation Coding Scheme (MCS), DCI, a rate matching pattern, DMRS type, number of DMRS symbols, antenna port, or a slot aggregation configuration, or any combination thereof. Moreover, depending on the type of receiving device 720, this configuration can be provided via Radio Resource Control (RRC), PCS, Medium Access Control (MAC) Control Element (CE) (MAC-CE), UCI, DCI, or Sidelink Control Information (SCI).

One type of RF sensing comprises shared physical channel aggregation. As previously noted, RF signals having a long duration can help increase SNR and Doppler resolution. However, because a shared physical channel may comprise a single-slot PxSCH, a single shared physical channel may not have sufficient duration for the desired SNR/Doppler resolution. Thus, according to some embodiments, aggregation of multiple shared physical channels occupying multiple successive or equally-spaced slots (e.g., 2 slots, 4 slots, or more) more) may be aggregated. In such instances, the receiving device 720 may be signaled (e.g., via RRC, MAC-CE, etc.) that a transmitted shared physical channel comprises a repetition over multiple slots, and that one or more of the repetitions can be used for RF sensing. This signaling of repetitions and/or use for RF sensing can be provided, for example, using a bitmap, start/and or on/off flag of all or none of the repetitions.

Another type of RF sensing comprises DMRS bundling. To provide effective RF sensing measurements, a receiving device 720 may need to perform a good first DMRS channel estimation. DMRS bundling, which involves using the same DMRS for multiple shared physical channels (which may not necessarily be repetitions of the same transport block (TB)), can help ensure good DMRS channel estimation. An RF sensing server may send the relevant information (e.g., DMRS scrambling ID, DMRS type, number of DMRS symbols, antenna port, number of physical shared channels bundled, etc.). The signaling of using the bundled DMRS for RF sensing (e.g., via a bitmap, flag, etc.) may be joint or separate from the DMRS-bundled signaling.

Another type of RF sensing comprises configured grant shared physical channels. According to some embodiments, a particular shared physical channel may be designated for RF sensing. For example, a UE may receive a configuration indicating for shared physical channels for normal PxSCH communications, and one shared physical channel (e.g., designated or tagged as "sensing-config") for RF sensing. The configuration received for RF sensing may be received together or separate from the configuration for other physical shared channel communications. Again, this configuration information may be provided via a flag/bitmap indicating which instances of a shared physical channel can be used for RF sensing. Depending on desired functionality, ACK/NAK timeline requirements may be extended for shared physical channels designated for RF sensing to allow for the additional (two-pass) processing.

Another type of RF sensing may result from a receiving device determining that a shared physical channel may be used for RF sensing. That is, in addition or as an alternative to receiving a configuration by an RF sensing server, a receiving device 720 may determine to perform RF sensing measurements using a particular shared physical channel. For example, a receiving device 720 may determine that a shared physical channel comprising a PDSCH or PSSCH (or the associated DMRS) can be used for sensing if certain conditions are met. For example, a UE may determine to use a shared physical channel for RF sensing if the shared physical channel is associated with (i) a Quasi Co-Location (QCL) of a reference signal that is explicitly used or designated for RF sensing, (ii) a QCL of a reference signal type other than a Tracking Reference Signal (TRS), or (iii) a QCL of a TRS which is determined to be associated with a non-servicing beam. In this case, the QCL may correspond to a Type-A, Type-C, Type-D (delay/doppler shift/spread, spatial QCL).

As previously noted, in some scenarios, a transmitting device 710 may not direct the RF signals 750 of the shared physical channel directly toward the receiving device 720, and may therefore not be using an optimal beam/QCL/direction for direct communications. Again, this can be used to facilitate RF sensing of a target 730 that may not be close to the receiving device 720. Because of this, the sensitivity of the RF front end of the receiving device 720 may need to be increased. Thus, according to some embodiments, an Automatic Gain Control (AGC) or Energy Per Resource Element (EPRE)-ratio offset value may be sent (e.g., by an RF sensing server) to the receiving device 720, prior to receiving the shared physical channel. This can allow the receiving device 722 set its AGC appropriately.

According to some embodiments, to facilitate RF sensing in a wireless communication network, two classes of shared physical channels may be defined: one that allows for RF sensing to be used, and one that does not. According to some embodiments, a shared physical channel that requires a fast response (e.g., a Ultra-Reliable Low-Latency Communication (URLLC) shared physical channel) may be designated as a shared physical channel that does not allow RF sensing to be used. For shared physical channels that are designated for RF sensing, a receiving device can then perform RF sensing measurements (e.g., ToA of additional paths, power delay profile, etc.) and report these measurements to the RF sensing server.

The designation of shared physical channels for RF sensing may be communicated in different ways, depending on whether the shared physical channel is sent via unicast, broadcast, or groupcast in Uu or SL. For example, in Uu, a UE may receive an indication (through a dedicated SIB, or a PDCCH order), that a broadcast PDSCH (e.g. scrambled with SI-RNTI, or P-RNTI) can be used for sensing. In SL, a UE may transmit a groupcast PSSCH and include an indication inside the PSSCH data or in the SCI (e.g. SCI-2) that this can be used for passive sensing. In this latter case, a UE may receive a request from a serving TRP (e.g., relay UE) to transmit a groupcast PSSCH for remote UEs to perform RF sensing. Additionally or alternatively, a UE may receive a request from a serving TRP (e.g., relay UE) to transmit a command to remote UEs (which may be out of coverage) to start transmitting PSSCH for the relay-UE to perform RF sensing.

Figure 8:
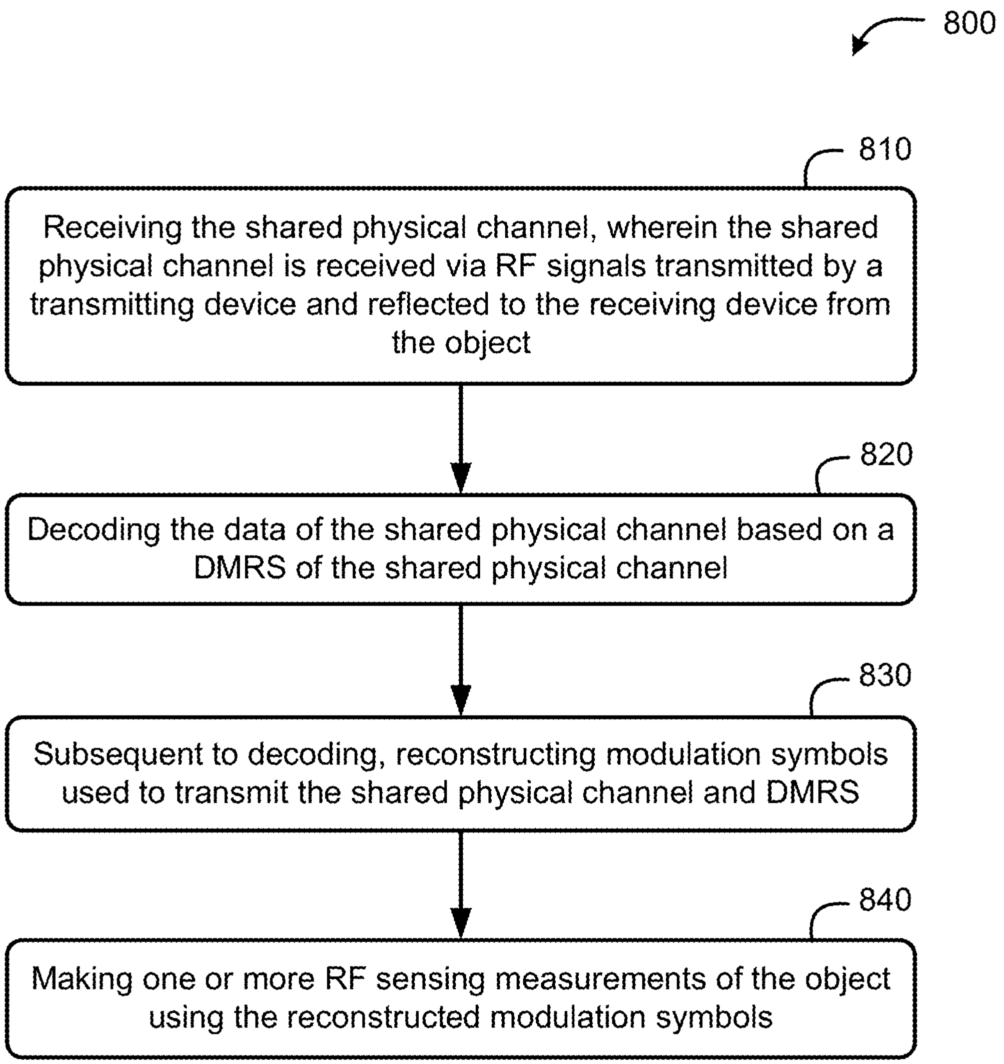
FIGS. 8 and 9 are flow diagrams of methods of using a shared physical channel for passive RF sensing of an object in a wireless communication network, according to an embodiment.
Figure 10:
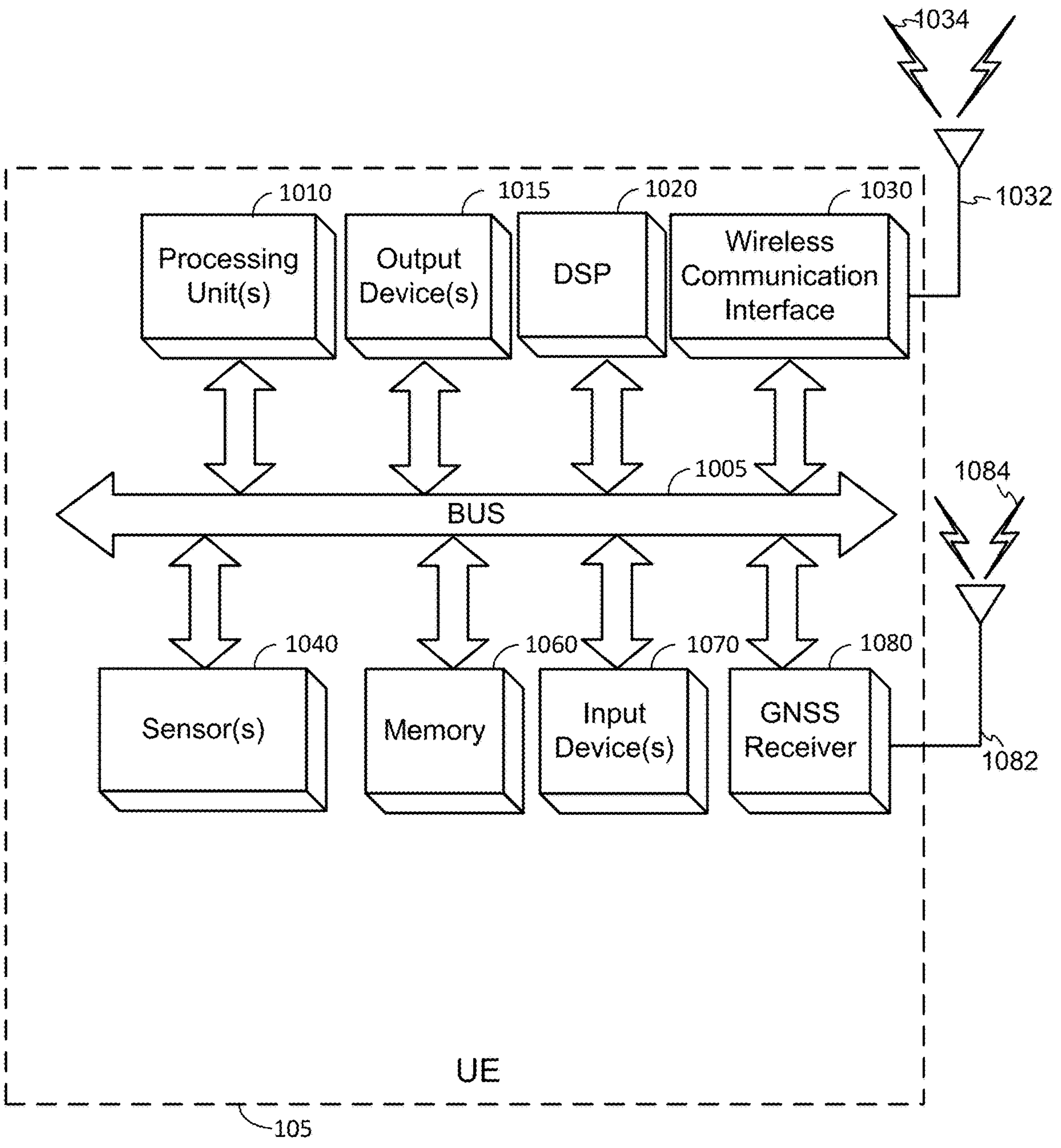
FIG. 10 is a block diagram of a User Equipment (UE), according to an embodiment.
Figure 11:
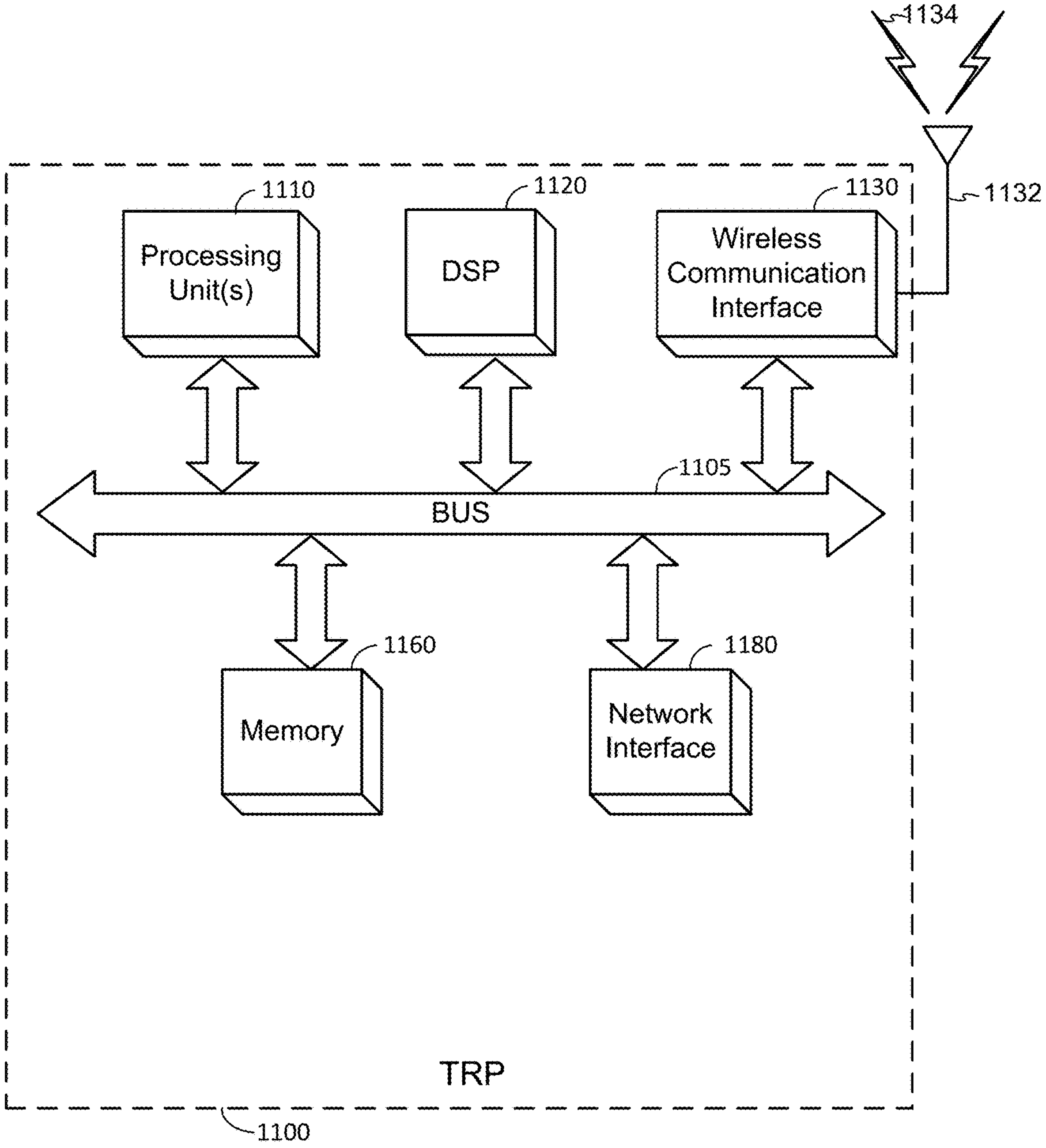
FIG. 11 is a block diagram of a Transmission Reception Point (TRP), according to an embodiment.

FIG. 8 is a flow diagram of a method 800 of using a shared physical channel for passive RF sensing of an object in a wireless communication network, according to an embodiment. Means for performing the functionality illustrated in one or more of the blocks shown in FIG. 8 may be performed by hardware and/or software components of a receiving device, such as a UE or TRP. Example components of a UE are illustrated in FIG. 10, and example components of a TRP are illustrated in FIG. 11, both of which are described in more detail below.

At block 810, the functionality comprises receiving the shared physical channel, wherein the shared physical channel is received via RF signals transmitted by a transmitting device and reflected to the receiving device from the object. As indicated in the embodiments previously described, RF sensing may be performed using a variety of different configurations in which the transmitting device sends receiving device may comprise any combination of UEs and TRPs. Moreover, as discussed with regard to FIG. 7B, the receiving device may not comprise the communication receiver intended to receive the data of the shared physical channel.

As previously indicated, according to some embodiments, a receiving device can receive the shared physical channel based on a previously-received configuration. This configuration may be provided by a RF sensing server and may be relayed to the receiving device by a serving TRP of the receiving device, if the receiving device comprises a UE. As such, alternative embodiments of the method 800 additionally may comprise receiving a configuration with information regarding one or more properties of the shared physical channel. In such embodiments, the one or more properties may comprise a frequency allocation, a time allocation, a scrambling ID, a MCS, DCI, a rate matching pattern, or a slot aggregation configuration, or any combination thereof. Furthermore, the configuration may be received via RRC, PC5, MAC-CE, UCI, DCI, or SCI, or any combination thereof. Additionally or alternatively, embodiments may designate a shared physical channel for RF sensing (e.g., which may be signaled to the receiving device via a flag, bitmap, etc.). Accordingly, alternative embodiments of the method 800 may further comprise receiving a configuration, prior to receiving the shared physical channel, indicating the shared physical channel is to be used for the passive RF sensing.

Other embodiments of the method 800 may include other functions, depending on desired functionality. For example, according to some embodiments, where the receiving device comprises a UE, the method 800 may further comprise determining to use the shared physical channel for the passive RF sensing based on a determination that the shared physical channel is associated with a QCL of a reference signal used for RF sensing purposes, a QCL of a reference signal type other than a Tracking Reference Signal (TRS), or a QCL of a TRS associated with a non-serving beam, or any combination thereof. Additionally or alternatively, embodiments may comprise setting an AGC setpoint prior to receiving the shared physical channel, based on a received ACG or EPRE-ratio offset value. Further, according to some embodiments, the transmitting device may transmit the shared physical channel using a Uu or SL interface.

Means for performing functionality at block 810 may comprise a bus 1005, processing unit(s) 1010, DSP 1020, wireless communications interface 1030, memory 1060, and/or other components of a UE, as illustrated in FIG. 10 and described in more detail below. Alternatively, means for performing functionality at block 810 may comprise a bus 1105, processing unit(s) 1110, DSP 1120, wireless communications interface 1130, memory 1160, and/or other components of a TRP, as illustrated in FIG. 11 and described in more detail below.

At block 820, the functionality comprises decoding the data of the shared physical channel based on a DMRS of the shared physical channel. This may include decoding may include sub-steps of channel estimation, demodulation, and decoding, as described herein. As previously noted, this process may comprise the first pass of the two-pass processing described in the embodiments herein.

Means for performing functionality at block 820 may comprise a bus 1005, processing unit(s) 1010, DSP 1020, memory 1060, and/or other components of a UE, as illustrated in FIG. 10 and described in more detail below. Alternatively, means for performing functionality at block 820 may comprise a bus 1105, processing unit(s) 1110, DSP 1120, memory 1160, and/or other components of a TRP, as illustrated in FIG. 11 and described in more detail below.

At block 830, the functionality comprises, subsequent to decoding, reconstructing modulation symbols used to transmit the shared physical channel and DMRS. As previously noted, this process may comprise the second pass of the two-pass processing described in the embodiments herein. As noted, According to some embodiments, this may be performed after verifying that data was correctly decoded from the shared physical channel. Thus, alternative embodiments of the method 800 may further comprise, prior to reconstructing the modulation symbols, verifying correct extraction of the data of the shared physical channel.

Means for performing functionality at block 830 may comprise a bus 1005, processing unit(s) 1010, DSP 1020, memory 1060, and/or other components of a UE, as illustrated in FIG. 10 and described in more detail below. Alternatively, means for performing functionality at block 830 may comprise a bus 1105, processing unit(s) 1110, DSP 1120, memory 1160, and/or other components of a TRP, as illustrated in FIG. 11 and described in more detail below.

At block 840, the functionality comprises, making one or more RF sensing measurements of the object using the reconstructed modulation symbols. As indicated herein, RF sensing measurements are measurements indicative of various aspects (e.g., location, angle, orientation, etc.) of a detected object. As such, measurements may comprise ToA measurements, power delay profile, and/or similar measurements made by the receiving device. The reconstructed modulation symbols can be used, for example, as a correlation reference for processing the shared physical channel and DMRS and obtaining the one or more RF sensing measurements. Moreover, according to some embodiments, the method 800 may further comprise determining one or more characteristics of the object based on the one or more RF sensing measurements. Depending on desired functionality, the one or more characteristics may comprise a location, an angle, a direction, an orientation, a Doppler value, or a velocity, or any combination thereof. Additionally or alternatively, the receiving device may send the one or more RF sensing measurements to a server (e.g., an RF sensing server), which may determine one or more characteristics from the RF sensing measurements.

Some embodiments may perform slot aggregation to obtain a better SNR and/or Doppler resolution. In such embodiments, the shared physical channel may be transmitted as part of a plurality of repeated transmissions of the shared physical channel by a transmitting device. The plurality of repeated transmissions may span a plurality of slots of an OFDM scheme used in the wireless communication network and making the one or more RF sensing measurements may comprise using reconstructed modulation symbols of two or more repeated transmissions of the shared physical channel.

Means for performing functionality at block 840 may comprise a bus 1005, processing unit(s) 1010, DSP 1020, wireless communications interface 1030, memory 1060, and/or other components of a UE, as illustrated in FIG. 10 and described in more detail below. Alternatively, means for performing functionality at block 840 may comprise a bus 1105, processing unit(s) 1110, DSP 1120, wireless communications interface 1130, memory 1160, and/or other components of a TRP, as illustrated in FIG. 11 and described in more detail below.

Figure 9:
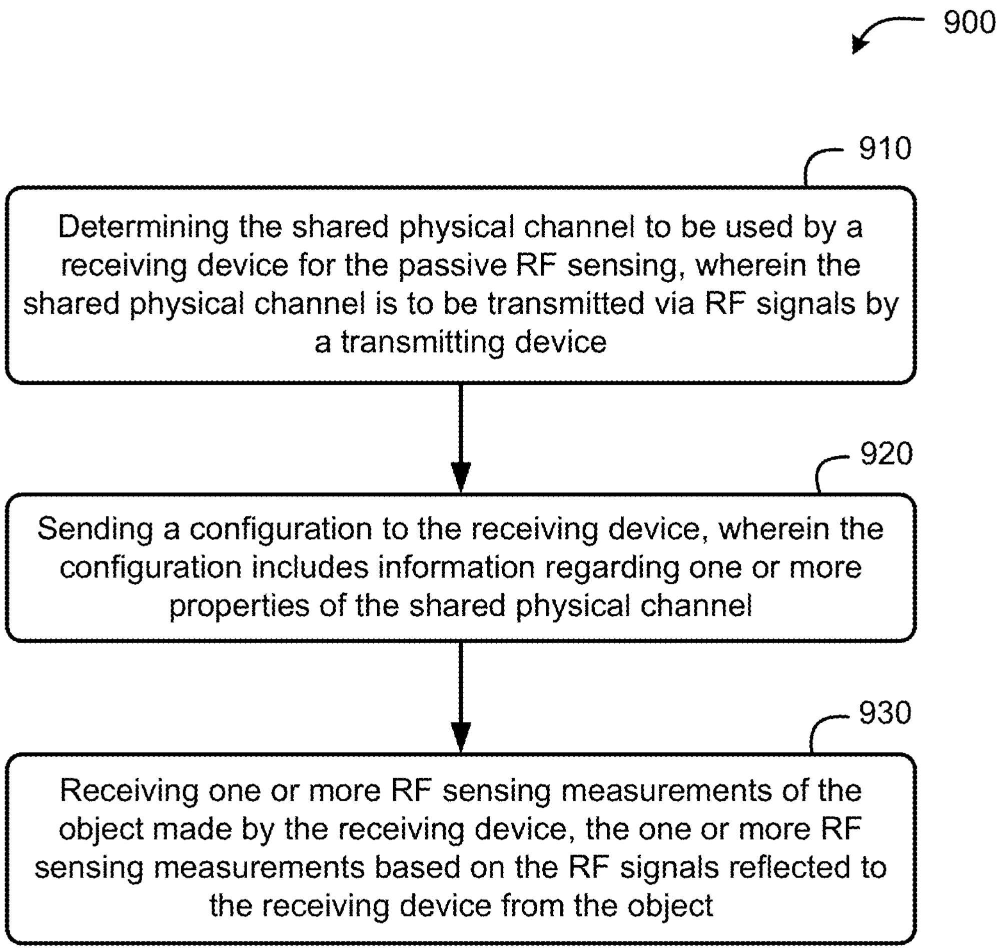

FIG. 9 is a flow diagram of a method 900 of method of using a shared physical channel for passive RF sensing of an object in a wireless communication network, which can be performed by an RF server, according to an embodiment. As such, means for performing the functionality illustrated in one or more of the blocks shown in FIG. 9 may be performed by hardware and/or software components of a computer system. Example components of a computer system are illustrated in FIG. 12, which is described in more detail below.

At block 910, the functionality comprises determining the shared physical channel to be used by a receiving device for the passive RF sensing, wherein the shared physical channel is to be transmitted via RF signals by a transmitting device. Again, the receiving device may comprise a UE or TRP, and the transmitting device may comprise a UE or TRP. Determining the shared physical channel is to be used by a receiving device for the passive RF sensing may be based on a variety of factors, including a need or request for RF sensing of the object, favorable characteristics (frequency, timing, repetition etc.) of the shared frequency channel, and availability of a receiving device (or a plurality of receiving devices) to perform RF sensing, and/or similar factors.

Figure 12:
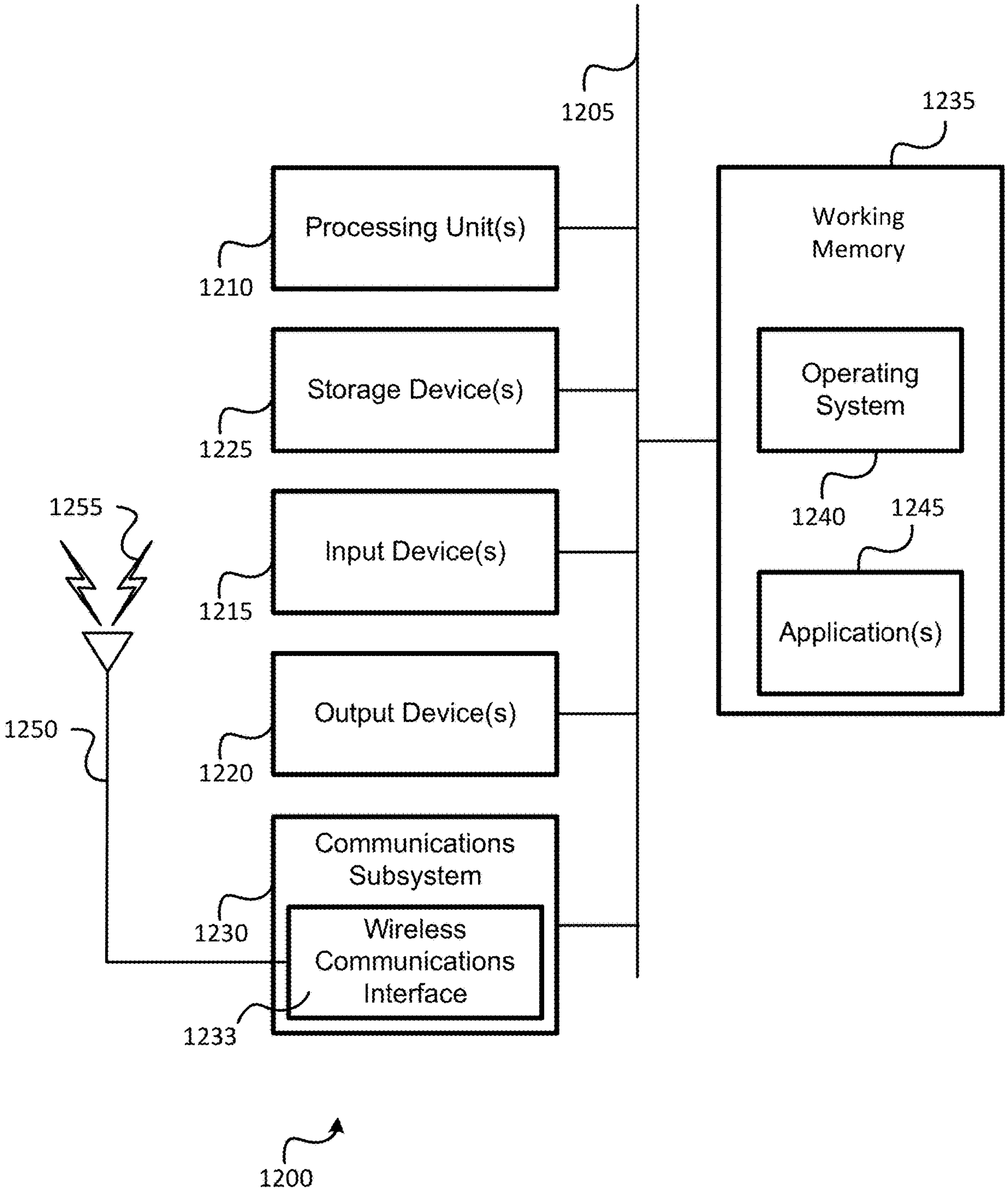
FIG. 12 is a block diagram of an embodiment of a computer system, which can be utilized in embodiments as described herein.

Means for performing functionality at block 910 may comprise a bus 1205, processing unit(s) 1210, communications subsystem 1230, working memory 1235, and/or other components of a computer system, as illustrated in FIG. 12 and described in more detail below.

At block 920, the functionality comprises sending a configuration to the receiving device, wherein the configuration includes information regarding one or more properties of the shared physical channel. As previously noted, the one or more properties may comprise a frequency allocation, a time allocation, a scrambling ID, an MCS, a DCI, a rate matching pattern, or a slot aggregation configuration, or any combination thereof. Further, as noted in previous embodiments, the configuration may include additional or alternative information. For example, according to some embodiments, the configuration may comprise an indication that the shared physical channel is to be used for the passive RF sensing. Additionally or alternatively, the configuration includes an Automatic Gain Control (AGC) or Energy Per Resource Element (EPRE)-ratio offset value.

Means for performing functionality at block 920 may comprise a bus 1205, processing unit(s) 1210, communications subsystem 1230, working memory 1235, and/or other components of a computer system, as illustrated in FIG. 12 and described in more detail below.

At block 930, the functionality comprises receiving one or more RF sensing measurements of the object made by the receiving device, the one or more RF sensing measurements based on the RF signals reflected to the receiving device from the object. As previously noted, the RF sensing device may send RF sensing measurements to an RF sensing server for determining one or more characteristics of the object. Moreover, in some embodiments, the RF sensing server may receive RF sensing measurements from a plurality of receiving devices for performing RF sensing of the object. And as noted, the plurality of receiving devices may perform RF sensing using the same or different RF signals (and corresponding shared physical channel) transmitted by the same or different transmitting device. Thus, some embodiments of the method 900 may further comprise determining a one or more characteristics of the object based on the one or more RF sensing measurements, where the one or more characteristics comprise a location, an angle, a direction, an orientation, a Doppler value, or a velocity, or any combination thereof.

Means for performing functionality at block 930 may comprise a bus 1205, processing unit(s) 1210, communications subsystem 1230, working memory 1235, and/or other components of a computer system, as illustrated in FIG. 12 and described in more detail below.

FIG. 10 illustrates an embodiment of a UE 105, which can be utilized as described herein above (e.g., in association with FIGS. 1-9). As noted in the embodiments above, a UE 105 may be used as a transmitting device 710, receiving device 720 and/or communication receiver 780 as described herein. For example, the UE 105 can perform one or more of the functions of the method shown in FIG. 8. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 10.

The UE 105 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). The UE 105 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 105 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1010, DSP 1020, and/or a processing unit within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1010 or DSP 1020.

The UE 105 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 105 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 105 (and/or processing unit(s) 1010 or DSP 1020 within UE 105). In an aspect, then such code and/or instructions can be used to configure and/or adapt a general-purpose computer (or other device) to perform one or more operations in accordance with the described methods.

FIG. 11 illustrates an embodiment of a TRP 1100, which can be utilized as described herein above (e.g., in association with FIGS. 1-10). TRP 1100 may correspond to one or more previously-described base stations, access points, and TRPs as described herein including, for example, base station 120, gNB 210, ng-eNB 214, TRP 430, and TRP 505. Moreover, similar to a UE, a TRP 1100 may also perform the functions of a transmitting device 710 or receiving device 720. As such, the TRP 1100 can perform one or more of the functions of the method shown in FIG. 8. It should be noted that FIG. 11 is meant only to provide a generalized illustration of various components, any or all of which may be utilized as appropriate.

The TRP 1100 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below), according to some embodiments. The TRP 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1100 to communicate as described herein. The wireless communication interface 1130 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1132 that send and/or receive wireless signals 1134.

The TRP 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the TRP 1100 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the TRP 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the TRP 1100 (and/or processing unit(s) 1110 or DSP 1120 within TRP 1100). In an aspect, then such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of one or more network and/or network-connected components as described herein. The computer system 1200 may therefore correspond with location server 160, external client 180, LMF 220, AMF 215, external client or AF 230, or the like. Moreover, the computer system 1200 may further comprise and/or execute an RF sensing server 560. As such, the computer system 1200 may be used to perform one or more operations of the method illustrated in FIG. 9. It can be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations. Further, according to some embodiments, a base station may incorporate aspects of a TRP 1100 and a computer system in a single device and/or at a single location. As such, some embodiments may comprise base stations that perform the functionality of TRP, as well as one or more servers (e.g., RF sensing server 560, location server 160, etc.).

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of using a shared physical channel for passive radio frequency (RF) sensing of an object in a wireless communication network, the method performed by a receiving device and comprising: receiving the shared physical channel, wherein the shared physical channel is received via RF signals transmitted by a transmitting device and reflected to the receiving device from the object; decoding data of the shared physical channel based on a Demodulation Reference Signal (DMRS) of the shared physical channel; subsequent to decoding, reconstructing modulation symbols used to transmit the shared physical channel and DMRS; and making one or more RF sensing measurements of the object using the reconstructed modulation symbols.

Clause 2. The method of clause 1, further comprising determining one or more characteristics of the object based on the one or more RF sensing measurements, wherein the one or more characteristics comprise: a location, an angle, a direction, an orientation, a Doppler value, or a velocity, or any combination thereof.

Clause 3. The method of clause 1 or 2, further comprising, prior to reconstructing the modulation symbols, verifying correct decoding of the data of the shared physical channel.

Clause 4. The method of any of clauses 1-3, further comprising sending the one or more RF sensing measurements to a server.

Clause 5. The method of any of clauses 1-4, wherein the receiving device comprises a User Equipment (UE) or Transmission Reception Point (TRP) of the wireless communication network.

Clause 6. The method of any of clauses 1-5, wherein the transmitting device comprises a UE or TRP of the wireless communication network.

Clause 7. The method of any of clauses 1-6, wherein: the shared physical channel is transmitted as part of a plurality of repeated transmissions of the shared physical channel by the transmitting device, wherein the plurality of repeated transmissions spans a plurality of slots of an Orthogonal Frequency-Division Multiplexing (OFDM) scheme used in the wireless communication network; and making the one or more RF sensing measurements comprises using reconstructed modulation symbols of two or more repeated transmissions of the shared physical channel.

Clause 8. The method of any of clauses 1-7, further comprising receiving a configuration with information regarding one or more properties of the shared physical channel, the one or more properties comprising: a frequency allocation, a time allocation, a scrambling ID, a Modulation Coding Scheme (MCS), Downlink Control Information (DCI), a rate matching pattern, or a slot aggregation configuration, or any combination thereof.

Clause 9. The method of clause 8, wherein the configuration is received via: Radio Resource Control (RRC), PC5, Medium Access Control (MAC) Control Element (CE) (MAC-CE), Uplink Control Information (UCI), Downlink Control Information (DCI), or Sidelink Control Information (SCI), or any combination thereof.

Clause 10. The method of any of clauses 1-9, further comprising receiving a configuration, prior to receiving the shared physical channel, indicating the shared physical channel is to be used for the passive RF sensing.

Clause 11. The method of any of clauses 1-10, wherein the receiving device comprises a UE, the method further comprising determining to use the shared physical channel for the passive RF sensing based on a determination that the shared physical channel is associated with a Quasi Co-Location (QCL) of a reference signal used for RF sensing purposes, a QCL of a reference signal type other than a Tracking Reference Signal (TRS), or a QCL of a TRS associated with a non-serving beam, or any combination thereof.

Clause 12. The method of any of clauses 1-11, further comprising setting an Automatic Gain Control (AGC) setpoint prior to receiving the shared physical channel, based on a received ACG or Energy Per Resource Element (EPRE)-ratio offset value.

Clause 13. The method of any of clauses 1-12, wherein the transmitting device transmits the shared physical channel using a Uu or Sidelink (SL) interface.

Clause 14. The method of any of clauses 1-13, wherein the receiving device is a different device than a communication receiver device for which the data of the shared physical channel is intended.

Clause 15. A method of using a shared physical channel for passive radio frequency (RF) sensing of an object in a wireless communication network, the method performed by a server and comprising: determining the shared physical channel to be used by a receiving device for the passive RF sensing, wherein the shared physical channel is to be transmitted via RF signals by a transmitting device; sending a configuration to the receiving device, wherein the configuration includes information regarding one or more properties of the shared physical channel; and receiving one or more RF sensing measurements of the object made by the receiving device, the one or more RF sensing measurements based on the RF signals reflected to the receiving device from the object.

Clause 16. The method of clause 15, further comprising determining one or more characteristics of the object based on the one or more RF sensing measurements, wherein the one or more characteristics comprise: a location, an angle, a direction, an orientation, a Doppler value, or a velocity, or any combination thereof.

Clause 17. The method of clause 15 or 16, wherein the receiving device comprises a User Equipment (UE) or Transmission Reception Point (TRP) of the wireless communication network.

Clause 18. The method of any of clauses 15-17, wherein the transmitting device comprises a UE or TRP of the wireless communication network.

Clause 19. The method of any of clauses 15-18, wherein the one or more properties of the shared physical channel comprise: a frequency allocation, a time allocation, a scrambling ID, a Modulation Coding Scheme (MCS), a Downlink Control Information (DCI), a rate matching pattern, or a slot aggregation configuration, or any combination thereof.

Clause 20. The method of any of clauses 15-19, wherein the configuration includes an indication that the shared physical channel is to be used for the passive RF sensing.

Clause 21. The method of any of clauses 15-20, wherein the configuration includes an Automatic Gain Control (AGC) or Energy Per Resource Element (EPRE)-ratio offset value.

Clause 22. The method of any of clauses 15-21, wherein the receiving device is a different device than a communication receiver device for which the data of the shared physical channel is intended.

Clause 23. A receiving device comprising: a transceiver; a memory; and one or more processing units communicatively coupled with the transceiver and the memory, the one or more processing units configured to: receive, via the transceiver, a shared physical channel, wherein the shared physical channel is received via radio frequency (RF) signals transmitted by a transmitting device and reflected to the receiving device from an object; decode data of the shared physical channel based on a Demodulation Reference Signal (DMRS) of the shared physical channel; subsequent to decoding, reconstruct modulation symbols used to transmit the shared physical channel and DMRS; and make one or more RF sensing measurements of the object using the reconstructed modulation symbols.

Clause 24. The receiving device of clause 23, wherein the one or more processing units are further configured to determine one or more characteristics of the object based on the one or more RF sensing measurements, wherein the one or more characteristics comprise: a location, an angle, a direction, an orientation, a Doppler value, or a velocity, or any combination thereof.

Clause 25. The receiving device of clause 23 or 24, wherein the one or more processing units are further configured to, prior to reconstructing the modulation symbols, verify correct decoding of the data of the shared physical channel.

Clause 26. The receiving device of any of clauses 23-25, wherein the one or more processing units are further configured to send the one or more RF sensing measurements to a server.

Clause 27. The receiving device of any of clauses 23-26, wherein the receiving device comprises a User Equipment (UE) or Transmission Reception Point (TRP) of a wireless communication network.

Clause 28. The receiving device of any of clauses 23-27, wherein the one or more processing units are further configured to: receive the shared physical channel as part of a plurality of repeated transmissions of the shared physical channel by a transmitting device, wherein the plurality of repeated transmissions spans a plurality of slots of an Orthogonal Frequency-Division Multiplexing (OFDM) scheme used in a wireless communication network; and to make the one or more RF sensing measurements, the one or more processing units are configured to use reconstructed modulation symbols of two or more repeated transmissions of the shared physical channel.

Clause 29. The receiving device of any of clauses 23-28, wherein the one or more processing units are further configured to receive a configuration with information regarding one or more properties of the shared physical channel, the one or more properties comprising: a frequency allocation, a time allocation, a scrambling ID, a Modulation Coding Scheme (MCS), Downlink Control Information (DCI), a rate matching pattern, or a slot aggregation configuration, or any combination thereof.

Clause 30. The receiving device of clause 29, wherein the one or more processing units are further configured to receive the configuration via: Radio Resource Control (RRC), PC5, Medium Access Control (MAC) Control Element (CE) (MAC-CE), Uplink Control Information (UCI), Downlink Control Information (DCI), or Sidelink Control Information (SCI), or any combination thereof.

Clause 31. The receiving device of any of clauses 23-30, wherein the one or more processing units are further configured to receive a configuration, prior to receiving the shared physical channel, indicating the shared physical channel is to be used for passive RF sensing.

Clause 32. The receiving device of any of clauses 23-31, wherein the receiving device comprises a UE, and wherein the one or more processing units are further configured to determine to use the shared physical channel for passive RF sensing based on a determination that the shared physical channel is associated with a Quasi Co-Location (QCL) of a reference signal used for RF sensing purposes, a QCL of a reference signal type other than a Tracking Reference Signal (TRS), or a QCL of a TRS associated with a non-serving beam, or any combination thereof.

Clause 33. The receiving device of any of clauses 23-32, wherein the one or more processing units are further configured to set an Automatic Gain Control (AGC) setpoint prior to receiving the shared physical channel, based on a received ACG or Energy Per Resource Element (EPRE)-ratio offset value.

Clause 34. The receiving device of any of clauses 23-33, wherein the one or more processing units are further configured to receive the shared physical channel using a Uu or Sidelink (SL) interface.

Clause 35. The receiving device of any of clauses 23-34, wherein the receiving device is a different device than a communication receiver device for which the data of the shared physical channel is intended.

Clause 36. A server comprising: a transceiver; a memory; and one or more processing units communicatively coupled with the transceiver and the memory, the one or more processing units configured to: determine a shared physical channel to be used by a receiving device for passive radio frequency (RF) sensing, wherein the shared physical channel is to be transmitted via RF signals by a transmitting device; send, via the transceiver, a configuration to the receiving device, wherein the configuration includes information regarding one or more properties of the shared physical channel; and receive, via the transceiver, one or more RF sensing measurements of an object made by the receiving device, the one or more RF sensing measurements based on the RF signals reflected to the receiving device from the object.

Clause 37. The server of clause 36, wherein the one or more processing units are further configured to determine one or more characteristics of the object based on the one or more RF sensing measurements, wherein the one or more characteristics comprise: a location, an angle, a direction, an orientation, a Doppler value, or a velocity, or any combination thereof.

Clause 38. The server of clause 36 or 37, wherein the receiving device comprises a User Equipment (UE) or Transmission Reception Point (TRP) of a wireless communication network.

Clause 39. The server of any of clauses 36-38, wherein the transmitting device comprises a UE or TRP of a wireless communication network.

Clause 40. The server of any of clauses 36-39, wherein the one or more properties of the shared physical channel comprise: a frequency allocation, a time allocation, a scrambling ID, a Modulation Coding Scheme (MCS), a Downlink Control Information (DCI), a rate matching pattern, or a slot aggregation configuration, or any combination thereof.

Clause 41. The server of any of clauses 36-40, wherein the one or more processing units are further configured to include, in the configuration, an indication that the shared physical channel is to be used for the passive RF sensing.

Clause 42. The server of any of clauses 36-41, wherein the one or more processing units are further configured to include, in the configuration, an Automatic Gain Control (AGC) or Energy Per Resource Element (EPRE)-ratio offset value.

Clause 43. The server of any of clauses 36-42, wherein the receiving device is a different device than a communication receiver device for which the data of the shared physical channel is intended.

Clause 44. A device for using a shared physical channel for passive radio frequency (RF) sensing of an object in a wireless communication network, the device comprising: means for receiving the shared physical channel, wherein the shared physical channel is received via RF signals transmitted by a transmitting device and reflected to the device from the object; means for decoding data of the shared physical channel based on a Demodulation Reference Signal (DMRS) of the shared physical channel; means for, subsequent to decoding, reconstructing modulation symbols used to transmit the shared physical channel and DMRS; and means for making one or more RF sensing measurements of the object using the reconstructed modulation symbols.

Clause 45. The device of clause 44, further comprising means for determining one or more characteristics of the object based on the one or more RF sensing measurements, wherein the one or more characteristics comprise: a location, an angle, a direction, an orientation, a Doppler value, or a velocity, or any combination thereof.

Clause 46. The device of clause 44 or 45, further comprising means for, prior to reconstructing the modulation symbols, verifying correct decoding of the data of the shared physical channel.

Clause 47. The device of any of clauses 44-46, further comprising means for sending the one or more RF sensing measurements to a server.

Clause 48. The device of any of clauses 44-47, wherein the device comprises a User Equipment (UE) or Transmission Reception Point (TRP) of the wireless communication network.

Clause 49. The device of any of clauses 44-48, wherein the transmitting device comprises a UE or TRP of the wireless communication network.

Clause 50. The device of any of clauses 44-49, wherein: the means for receiving the shared physical channel are configured to receive the shared physical channel as part of a plurality of repeated transmissions of the shared physical channel by the transmitting device, wherein the plurality of repeated transmissions spans a plurality of slots of an Orthogonal Frequency-Division Multiplexing (OFDM) scheme used in the wireless communication network; and means for making the one or more RF sensing measurements comprises means for using reconstructed modulation symbols of two or more repeated transmissions of the shared physical channel.

Clause 51. The device of any of clauses 44-50, further comprising means for receiving a configuration with information regarding one or more properties of the shared physical channel, the one or more properties comprising: a frequency allocation, a time allocation, a scrambling ID, a Modulation Coding Scheme (MCS), Downlink Control Information (DCI), a rate matching pattern, or a slot aggregation configuration, or any combination thereof.

Clause 52. The device of clause 51, wherein the means for receiving the configuration are configured to receive the configuration via: Radio Resource Control (RRC), PCS, Medium Access Control (MAC) Control Element (CE) (MAC-CE), Uplink Control Information (UCI), Downlink Control Information (DCI), or Sidelink Control Information (SCI), or any combination thereof.

Clause 53. The device of any of clauses 44-52, further comprising means for receiving a configuration receiving a configuration, prior to receiving the shared physical channel, indicating the shared physical channel is to be used for the passive RF sensing.

Clause 54. The device of any of clauses 44-53, wherein the device comprises a UE, the device further comprising means for determining to use the shared physical channel for the passive RF sensing based on a determination that the shared physical channel is associated with a Quasi Co-Location (QCL) of a reference signal used for RF sensing purposes, a QCL of a reference signal type other than a Tracking Reference Signal (TRS), or a QCL of a TRS associated with a non-serving beam, or any combination thereof.

Clause 55. The device of any of clauses 44-54, further comprising setting an Automatic Gain Control (AGC) setpoint prior to receiving the shared physical channel, based on a received ACG or Energy Per Resource Element (EPRE)-ratio offset value.

Clause 56. The device of any of clauses 44-55, wherein the device is configured to receive the shared physical channel using a Uu or Sidelink (SL) interface.

Clause 57. The device of any of clauses 44-56, wherein the device is a different device than a communication receiver device for which the data of the shared physical channel is intended.

Clause 58. A system for using a shared physical channel for passive radio frequency (RF) sensing of an object in a wireless communication network, the system comprising: means for determining the shared physical channel to be used by a receiving device for the passive RF sensing, wherein the shared physical channel is to be transmitted via RF signals by a transmitting device; means for sending a configuration to the receiving device, wherein the configuration includes information regarding one or more properties of the shared physical channel; and means for receiving one or more RF sensing measurements of the object made by the receiving device, the one or more RF sensing measurements based on the RF signals reflected to the receiving device from the object.

Clause 59. The system of clause 58, further comprising means for determining one or more characteristics of the object based on the one or more RF sensing measurements, wherein the one or more characteristics comprise: a location, an angle, a direction, an orientation, a Doppler value, or a velocity, or any combination thereof.

Clause 60. The system of clause 58 or 59, wherein the receiving device comprises a User Equipment (UE) or Transmission Reception Point (TRP) of the wireless communication network.

Clause 61. The system of any of clauses 58-60, wherein the transmitting device comprises a UE or TRP of the wireless communication network.

Clause 62. The system of any of clauses 58-61, wherein the one or more properties of the shared physical channel comprise: a frequency allocation, a time allocation, a scrambling ID, a Modulation Coding Scheme (MCS), a Downlink Control Information (DCI), a rate matching pattern, or a slot aggregation configuration, or any combination thereof.

Clause 63. The system of any of clauses 58-62, further comprising means for including, in the configuration, an indication that the shared physical channel is to be used for the passive RF sensing.

Clause 64. The system of any of clauses 58-63, further comprising means for including, in the configuration, an Automatic Gain Control (AGC) or Energy Per Resource Element (EPRE)-ratio offset value.

Clause 65. The system of any of clauses 58-64, wherein the receiving device is a different device than a communication receiver device for which the data of the shared physical channel is intended.

Clause 66. A non-transitory computer-readable medium storing instructions for using a shared physical channel for passive radio frequency (RF) sensing of an object in a wireless communication network, the instructions comprising code for: receiving the shared physical channel, wherein the shared physical channel is received via RF signals transmitted by a transmitting device and reflected to the device from the object; decoding data of the shared physical channel based on a Demodulation Reference Signal (DMRS) of the shared physical channel; subsequent to decoding, reconstructing modulation symbols used to transmit the shared physical channel and DMRS; and making one or more RF sensing measurements of the object using the reconstructed modulation symbols.

Clause 67. The non-transitory computer-readable medium of clause 66, wherein the instructions further comprise code for determining one or more characteristics of the object based on the one or more RF sensing measurements, wherein the one or more characteristics comprise: a location, an angle, a direction, an orientation, a Doppler value, or a velocity, or any combination thereof.

Clause 68. The non-transitory computer-readable medium of clause 66 or 67, wherein the instructions further comprise code for, prior to reconstructing the modulation symbols, verifying correct decoding of the data of the shared physical channel.

Clause 69. The non-transitory computer-readable medium of any of clauses 66-68, wherein the instructions further comprise code for sending the one or more RF sensing measurements to a server.

Clause 70. The non-transitory computer-readable medium of any of clauses 66-69, wherein: wherein the instructions further comprise code for receiving the shared physical channel as part of a plurality of repeated transmissions of the shared physical channel by the transmitting device, wherein the plurality of repeated transmissions spans a plurality of slots of an Orthogonal Frequency-Division Multiplexing (OFDM) scheme used in the wireless communication network; and code for making the one or more RF sensing measurements comprises code for using reconstructed modulation symbols of two or more repeated transmissions of the shared physical channel.

Clause 71. The non-transitory computer-readable medium of any of clauses 66-70, wherein the instructions further comprise code for receiving a configuration with information regarding one or more properties of the shared physical channel, the one or more properties comprising: a frequency allocation, a time allocation, a scrambling ID, a Modulation Coding Scheme (MCS), Downlink Control Information (DCI), a rate matching pattern, or a slot aggregation configuration, or any combination thereof.

Clause 72. The non-transitory computer-readable medium of clause 71, wherein the code for receiving the configuration includes code for receiving the configuration via: Radio Resource Control (RRC), PC5, Medium Access Control (MAC) Control Element (CE) (MAC-CE), Uplink Control Information (UCI), Downlink Control Information (DCI), or Sidelink Control Information (SCI), or any combination thereof.

Clause 73. The non-transitory computer-readable medium of any of clauses 66-72, wherein the instructions further comprise code for receiving a configuration receiving a configuration, prior to receiving the shared physical channel, indicating the shared physical channel is to be used for the passive RF sensing.

Clause 74. The non-transitory computer-readable medium of any of clauses 66-73, wherein the instructions further comprise code for determining to use the shared physical channel for the passive RF sensing based on a determination that the shared physical channel is associated with a Quasi Co-Location (QCL) of a reference signal used for RF sensing purposes, a QCL of a reference signal type other than a Tracking Reference Signal (TRS), or a QCL of a TRS associated with a non-serving beam, or any combination thereof.

Clause 75. The non-transitory computer-readable medium of any of clauses 66-74, wherein the instructions further comprise code for setting an Automatic Gain Control (AGC) setpoint prior to receiving the shared physical channel, based on a received ACG or Energy Per Resource Element (EPRE)-ratio offset value.

Clause 76. The non-transitory computer-readable medium of any of clauses 66-75, wherein the instructions further comprise code for receiving the shared physical channel using a Uu or Sidelink (SL) interface.

Clause 77. A non-transitory computer-readable medium storing instructions for using a shared physical channel for passive radio frequency (RF) sensing of an object in a wireless communication network, the instructions comprising code for: determining the shared physical channel to be used by a receiving device for the passive RF sensing, wherein the shared physical channel is to be transmitted via RF signals by a transmitting device; sending a configuration to the receiving device, wherein the configuration includes information regarding one or more properties of the shared physical channel; and receiving one or more RF sensing measurements of the object made by the receiving device, the one or more RF sensing measurements based on the RF signals reflected to the receiving device from the object.

Clause 78. The non-transitory computer-readable medium of clause 77, wherein the instructions further comprise code for determining one or more characteristics of the object based on the one or more RF sensing measurements, wherein the one or more characteristics comprise: a location, an angle, a direction, an orientation, a Doppler value, or a velocity, or any combination thereof.

Clause 79. The non-transitory computer-readable medium of clause 77 or 78, wherein the receiving device comprises a User Equipment (UE) or Transmission Reception Point (TRP) of the wireless communication network.

Clause 80. The non-transitory computer-readable medium of any of clauses 77-79, wherein the transmitting device comprises a UE or TRP of the wireless communication network.

Clause 81. The non-transitory computer-readable medium of any of clauses 77-80, wherein the one or more properties of the shared physical channel comprise: a frequency allocation, a time allocation, a scrambling ID, a Modulation Coding Scheme (MCS), a Downlink Control Information (DCI), a rate matching pattern, or a slot aggregation configuration, or any combination thereof.

Clause 82. The non-transitory computer-readable medium of any of clauses 77-81, wherein the instructions further comprise code for including, in the configuration, an indication that the shared physical channel is to be used for the passive RF sensing.

Clause 83. The non-transitory computer-readable medium of any of clauses 77-82, wherein the instructions further comprise code for including, in the configuration, an Automatic Gain Control (AGC) or Energy Per Resource Element (EPRE)-ratio offset value.

Clause 84. The non-transitory computer-readable medium of any of clauses 77-83, wherein the receiving device is a different device than a communication receiver device for which the data of the shared physical channel is intended.

What is claimed is:

1. A method of using a shared physical channel for passive radio frequency (RF) sensing of an object in a wireless communication network, the method performed by a receiving device and comprising:

receiving the shared physical channel, wherein the shared physical channel is received via RF signals transmitted by a transmitting device and reflected to the receiving device from the object;

decoding data of the shared physical channel based on a Demodulation Reference Signal (DMRS) of the shared physical channel;

subsequent to decoding, reconstructing modulation symbols used to transmit the shared physical channel and DMRS, wherein correct decoding of the data of the shared physical channel is verified prior to reconstructing the modulation symbols; and making one or more RF sensing measurements of the object using the reconstructed modulation symbols.

2. The method of claim 1, further comprising determining one or more characteristics of the object based on the one or more RF sensing measurements, wherein the one or more characteristics comprise:

a location,
an angle,
a direction,
an orientation,
a Doppler value, or
a velocity, or
any combination thereof.

3. The method of claim 1, further comprising sending the one or more RF sensing measurements to a server.

4. The method of claim 1, wherein the receiving device comprises a User Equipment (UE) or Transmission Reception Point (TRP) of the wireless communication network.

5. The method of claim 1, wherein the transmitting device comprises a UE or TRP of the wireless communication network.

6. The method of claim 1, wherein:

the shared physical channel is transmitted as part of a plurality of repeated transmissions of the shared physical channel by the transmitting device, wherein the plurality of repeated transmissions spans a plurality of slots of an Orthogonal Frequency-Division Multiplexing (OFDM) scheme used in the wireless communication network; and making the one or more RF sensing measurements comprises using reconstructed modulation symbols of two or more repeated transmissions of the shared physical channel.

7. The method of claim 1, further comprising receiving a configuration with information regarding one or more properties of the shared physical channel, the one or more properties comprising:

a frequency allocation,
a time allocation,
a scrambling ID,
a Modulation Coding Scheme (MCS),
Downlink Control Information (DCI),
a rate matching pattern, or a slot aggregation configuration, or
any combination thereof.

8. The method of claim 7, wherein the configuration is received via:
Radio Resource Control (RRC),
PC5,
Medium Access Control (MAC) Control Element (CE) (MAC-CE),
Uplink Control Information (UCI),
Downlink Control Information (DCI), or
Sidelink Control Information (SCI), or
any combination thereof.

9. The method of claim 1, further comprising receiving a configuration, prior to receiving the shared physical channel, indicating the shared physical channel is to be used for the passive RF sensing.

10. The method of claim 1, wherein the receiving device comprises a UE, the method further comprising determining to use the shared physical channel for the passive RF sensing based on a determination that the shared physical channel is associated with
a Quasi Co-Location (QCL) of a reference signal used for RF sensing purposes,
a QCL of a reference signal type other than a Tracking Reference Signal (TRS), or
a QCL of a TRS associated with a non-serving beam, or
any combination thereof.

11. The method of claim 1, further comprising setting an Automatic Gain Control (AGC) setpoint prior to receiving the shared physical channel, based on a received ACG or Energy Per Resource Element (EPRE)-ratio offset value.

12. The method of claim 1, wherein the transmitting device transmits the shared physical channel using a Uu or Sidelink (SL) interface.

13. The method of claim 1, wherein the receiving device is a different device than a communication receiver device for which the data of the shared physical channel is intended.

14. A method of using a shared physical channel for passive radio frequency (RF) sensing of an object in a wireless communication network, the method performed by a server and comprising:
determining the shared physical channel to be used by a receiving device for the passive RF sensing, wherein the shared physical channel is to be transmitted via RF signals by a transmitting device;
sending a configuration to the receiving device, wherein the configuration includes information regarding one or more properties of the shared physical channel; and
receiving one or more RF sensing measurements of the object made by the receiving device, the one or more RF sensing measurements based on the RF signals reflected to the receiving device from the object.

15. The method of claim 14, further comprising determining one or more characteristics of the object based on the one or more RF sensing measurements, wherein the one or more characteristics comprise:
a location,
an angle,
a direction,
an orientation,
a Doppler value, or
a velocity, or
any combination thereof.

16. The method of claim 14, wherein the receiving device comprises a User Equipment (UE) or Transmission Reception Point (TRP) of the wireless communication network.

17. The method of claim 14, wherein the transmitting device comprises a UE or TRP of the wireless communication network.

18. The method of claim 14, wherein the one or more properties of the shared physical channel comprise:
a frequency allocation,
a time allocation,
a scrambling ID,
a Modulation Coding Scheme (MCS),
a Downlink Control Information (DCI),
a rate matching pattern, or
a slot aggregation configuration, or
any combination thereof.

19. The method of claim 14, wherein the configuration includes an indication that the shared physical channel is to be used for the passive RF sensing.

20. A receiving device comprising:
a transceiver;
a memory; and
one or more processing units communicatively coupled with the transceiver and the memory, the one or more processing units configured to:
receive, via the transceiver, a shared physical channel, wherein the shared physical channel is received via radio frequency (RF) signals transmitted by a transmitting device and reflected to the receiving device from an object;
decode data of the shared physical channel based on a Demodulation Reference Signal (DMRS) of the shared physical channel;
subsequent to decoding, reconstruct modulation symbols used to transmit the shared physical channel and DMRS, wherein correct decoding of the data of the shared physical channel is verified prior to reconstructing the modulation symbols; and
make one or more RF sensing measurements of the object using the reconstructed modulation symbols.

21. The receiving device of claim 20, wherein the one or more processing units are further configured to determine one or more characteristics of the object based on the one or more RF sensing measurements, wherein the one or more characteristics comprise:
a location,
an angle,
a direction,
an orientation,
a Doppler value, or
a velocity, or
any combination thereof.

22. The receiving device of claim 20, wherein the one or more processing units are further configured to send the one or more RF sensing measurements to a server.

23. The receiving device of claim 20, wherein the one or more processing units are further configured to:
receive the shared physical channel as part of a plurality of repeated transmissions of the shared physical channel by the transmitting device, wherein the plurality of repeated transmissions spans a plurality of slots of an Orthogonal Frequency-Division Multiplexing (OFDM) scheme used in a wireless communication network; and
to make the one or more RF sensing measurements, the one or more processing units are configured to use reconstructed modulation symbols of two or more repeated transmissions of the shared physical channel.

24. The receiving device of claim 20, wherein the one or more processing units are further configured to receive a configuration with information regarding one or more properties of the shared physical channel, the one or more properties comprising:

a frequency allocation, a time allocation, a scrambling ID, a Modulation Coding Scheme (MCS), Downlink Control Information (DCI), a rate matching pattern, or a slot aggregation configuration, or any combination thereof.

25. A server comprising:

a transceiver;

a memory; and one or more processing units communicatively coupled with the transceiver and the memory, the one or more processing units configured to:

determine a shared physical channel to be used by a receiving device for passive radio frequency (RF) sensing, wherein the shared physical channel is to be transmitted via RF signals by a transmitting device;

send, via the transceiver, a configuration to the receiving device, wherein the configuration includes information regarding one or more properties of the shared physical channel; and receive, via the transceiver, one or more RF sensing measurements of an object made by the receiving device, the one or more RF sensing measurements based on the RF signals reflected to the receiving device from the object.

26. The server of claim 25, wherein the one or more processing units are further configured to determine one or more characteristics of the object based on the one or more RF sensing measurements, wherein the one or more characteristics comprise:

a location, an angle, a direction, an orientation, a Doppler value, or a velocity, or any combination thereof.

27. The server of claim 25, wherein the one or more processing units are further configured to include, in the configuration, an indication that the shared physical channel is to be used for the passive RF sensing.

28. The server of claim 25, wherein the one or more processing units are further configured to include, in the configuration, an Automatic Gain Control (AGC) or Energy Per Resource Element (EPRE)-ratio offset value.

* * * * *